(12) United States Patent
Kim et al.

(10) Patent No.: US 11,132,020 B2
(45) Date of Patent: Sep. 28, 2021

(54) FOLDABLE ELECTRONIC DEVICE

(71) Applicant: Samsung Electronics Co., Ltd., Gyeonggi-do (KR)

(72) Inventors: Minsoo Kim, Gyeonggi-do (KR); Bongsub Kim, Gyeonggi-do (KR); Taewon Kim, Gyeonggi-do (KR); Sangmin Lee, Gyeonggi-do (KR); Jongheon Lee, Gyeonggi-do (KR); Jiwoo Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/850,240

(22) Filed: Apr. 16, 2020

(65) Prior Publication Data

US 2020/0333836 A1    Oct. 22, 2020

(30) Foreign Application Priority Data

Apr. 18, 2019    (KR) ........................ 10-2019-0045696

(51) Int. Cl.
*G06F 1/16*    (2006.01)

(52) U.S. Cl.
CPC .......... *G06F 1/1616* (2013.01); *G06F 1/1643* (2013.01); *G06F 1/1652* (2013.01); *G06F 1/1683* (2013.01)

(58) Field of Classification Search
CPC combination set(s) only.
See application file for complete search history.

(56) References Cited

U.S. PATENT DOCUMENTS

| | | |
|---|---|---|
| 8,929,085 B2 | 1/2015 | Franklin et al. |
| 9,274,562 B2 | 3/2016 | Franklin et al. |
| 9,476,704 B2 | 10/2016 | Choi et al. |
| 9,557,874 B2 | 1/2017 | Franklin et al. |
| 9,619,096 B2 | 4/2017 | Lee et al. |

(Continued)

FOREIGN PATENT DOCUMENTS

| | | |
|---|---|---|
| EP | 3 220 242 | 9/2017 |
| JP | 2008-026217 | 2/2008 |
| JP | 2012-014461 | 1/2012 |

OTHER PUBLICATIONS

International Search Report dated Jul. 31, 2020 issued in counterpart application No. PCT/KR2020/005172, 10 pages.

(Continued)

*Primary Examiner* — Lisa Lea-Edmonds
(74) *Attorney, Agent, or Firm* — The Farrell Law Firm, P.C.

(57) ABSTRACT

Disclosed is a foldable electronic device including a flexible display, a sensor panel, a sensor circuitry, a first housing, a second housing, and a folding structure configured to rotate the first housing or the second housing. The sensor panel includes a plurality of loop coils. The sensor circuitry transmits or receives a first resonance signal to recognize an operation of an electronic pen through the plurality of loop coils, outputs a second resonance signal through a first loop coil included in one panel part of the first panel part or the second panel part, receives the second resonance signal through a second loop coil included in a remaining one panel part of the first panel part or the second panel part, and determines an angle between the first housing and the second housing, based on the received second resonance signal.

20 Claims, 16 Drawing Sheets

(56) References Cited

U.S. PATENT DOCUMENTS

| | | | |
|---|---|---|---|
| 9,754,520 B2 | 9/2017 | Kwon et al. | |
| 9,971,448 B2 | 5/2018 | Franklin et al. | |
| 10,036,603 B2 | 7/2018 | Maranli | |
| 10,317,947 B2* | 6/2019 | Park | G06F 1/1652 |
| 10,318,061 B2 | 6/2019 | Franklin et al. | |
| 10,354,566 B2 | 7/2019 | Kwon et al. | |
| 10,393,516 B2 | 8/2019 | Choi et al. | |
| 10,409,415 B2 | 9/2019 | Sakabe et al. | |
| 10,466,745 B2 | 11/2019 | Zhao et al. | |
| 10,546,545 B2 | 1/2020 | Yamazaki et al. | |
| 10,552,019 B2* | 2/2020 | Agarwal | G06F 3/04883 |
| 10,691,243 B2 | 6/2020 | Hei et al. | |
| 10,739,908 B2 | 8/2020 | Franklin et al. | |
| 2014/0055429 A1 | 2/2014 | Kwon et al. | |
| 2014/0202014 A1 | 7/2014 | Choi et al. | |
| 2014/0362012 A1 | 12/2014 | Lee et al. | |
| 2015/0378557 A1* | 12/2015 | Jeong | G06F 3/0484 715/835 |
| 2016/0037311 A1* | 2/2016 | Cho | H04W 4/12 455/466 |
| 2016/0188197 A1* | 6/2016 | Ryu | G06F 1/1626 345/156 |
| 2017/0016720 A1 | 1/2017 | Choi et al. | |
| 2017/0115081 A1 | 4/2017 | Maranli | |
| 2017/0308230 A1 | 10/2017 | Sakabe et al. | |
| 2017/0316750 A1 | 11/2017 | Yamazaki et al. | |
| 2017/0322596 A1 | 11/2017 | Zhao et al. | |
| 2017/0345351 A1 | 11/2017 | Kwon et al. | |
| 2018/0260072 A1 | 9/2018 | Franklin et al. | |
| 2019/0042042 A1 | 2/2019 | Hei et al. | |
| 2019/0250671 A1* | 8/2019 | Park | G06F 3/04886 |
| 2019/0258397 A1* | 8/2019 | Ryu | G06F 3/0488 |
| 2019/0340964 A1 | 11/2019 | Kwon et al. | |
| 2019/0360803 A1 | 11/2019 | Choi et al. | |

OTHER PUBLICATIONS

European Search Report dated Sep. 15, 2020 issued in counterpart application No. 20170360.0-1203, 13 pages.

* cited by examiner

FOLDABLE ELECTRONIC DEVICE

CROSS-REFERENCE TO RELATED APPLICATION(S)

This application is based on and claims priority under 35 U.S.C. § 119 to Korean Patent Application No. 10-2019-0045696, filed on Apr. 18, 2019, in the Korean Intellectual Property Office, the disclosure of which is incorporated herein by reference in its entirety.

BACKGROUND

1. Field

The disclosure relates generally to an electronic device, and more particularly, to a foldable electronic device.

2. Description of Related Art

Recently, a foldable electronic device has been released with a flexible display that enables a smartphone or a tablet personal computer (PC) display to be folded or unfolded. A user may use a wide display screen when the foldable electronic device is in the unfolded state, and may conveniently grip or move the foldable electronic device when in the folded state. The foldable electronic device may recognize a touch input of a user through a touch panel or a digitizer panel or recognize an input using an electronic pen.

A conventional foldable electronic device may recognize the unfolded or folded state using a magnet and a Hall sensor. The foldable electronic device may include a magnet in a first housing and a Hall sensor in a second housing positioned in a direction opposite to the first housing. When the foldable electronic device is folded, the magnet and the Hall sensor may be disposed to overlap each other. The foldable electronic device may sense the unfolded or folded state through the variation in an output voltage of the Hall sensor, which corresponds to a magnetic flux generated from the magnet. In the conventional foldable electronic device, the operating characteristic of a peripheral component (e.g., an electromagnetic radiatizp on (EMR) digitizer panel) is changed due to the magnetic field generated from the magnet, which causes performance degradation.

Another conventional foldable electronic device may sense an operating state of the electronic pen by using a half-duplex type EMR sensing structure having a form including one transmission (TX) coil and a plurality of reception (RX) coils. The half-duplex type EMR sensing structure is problematic in that it is difficult to sense the unfolded state or the folded state of the foldable electronic device through the EMR digitizer panel.

Therefore, a need exists in the art for a foldable electronic device that eliminates the folded and unfolded state sensing issues and performance degradation issues prevalent in the conventional foldable electronic device.

SUMMARY

Aspects of the disclosure are to address at least the above-mentioned problems and/or disadvantages and to provide at least the advantages described below.

Accordingly, an aspect of the disclosure is to provide a foldable electronic device that may sense the folding state of the foldable electronic device using the sensor panel (e.g., a digitizer panel).

Another aspect of the disclosure is to provide a foldable electronic device that may distinguish between the signal to recognize the operation of the electronic pen and the signal to sense the folding state of the foldable electronic device, by changing the frequency or the intensity of the resonance signal.

Another aspect of the disclosure is to provide a foldable electronic device that may sense the folding state of the foldable electronic device without using a separate magnet or Hall sensor to prevent the erroneous operation caused by the magnetic property.

In accordance with an aspect of the disclosure, a foldable electronic device includes a flexible display, a sensor panel disposed adjacent to an inner surface of the flexible display, a sensor circuitry configured to control the sensor panel, a first housing equipped with a first display part of the flexible display and a first panel part of the sensor panel, a second housing equipped with a second display part of the flexible display and a second panel part of the sensor panel, and a folding structure configured to rotate the first housing or the second housing, wherein the sensor panel includes a plurality of loop coils, and wherein the sensor circuitry is further configured to transmit or receive a first resonance signal to recognize an operation of an electronic pen through the plurality of loop coils, output a second resonance signal through a first loop coil included in one panel part of the first panel part or the second panel part, receive the second resonance signal through a second loop coil included in a remaining one panel part of the first panel part or the second panel part, and determine an angle between the first housing and the second housing, based on the received second resonance signal.

In accordance with another aspect of the disclosure, a foldable electronic device includes a flexible display, a first housing equipped with a first display part of the flexible display, a second housing equipped with a second display part of the flexible display, a folding structure configured to rotate the first housing or the second housing, a first coil disposed inside the first housing, a second coil disposed inside the second housing, and a processor configured to output a resonance signal through the first coil, receive the resonance signal through the second coil, and determine an angle between the first housing and the second housing, based on the received resonance signal.

BRIEF DESCRIPTION OF THE DRAWINGS

The above and other aspects, features, and advantages of certain embodiments of the disclosure will be more apparent from the following description taken in conjunction with the accompanying drawings, in which.

In the following description made with respect to the accompanying drawings, similar components will be assigned with similar reference numerals.

DETAILED DESCRIPTION

Figure 1:
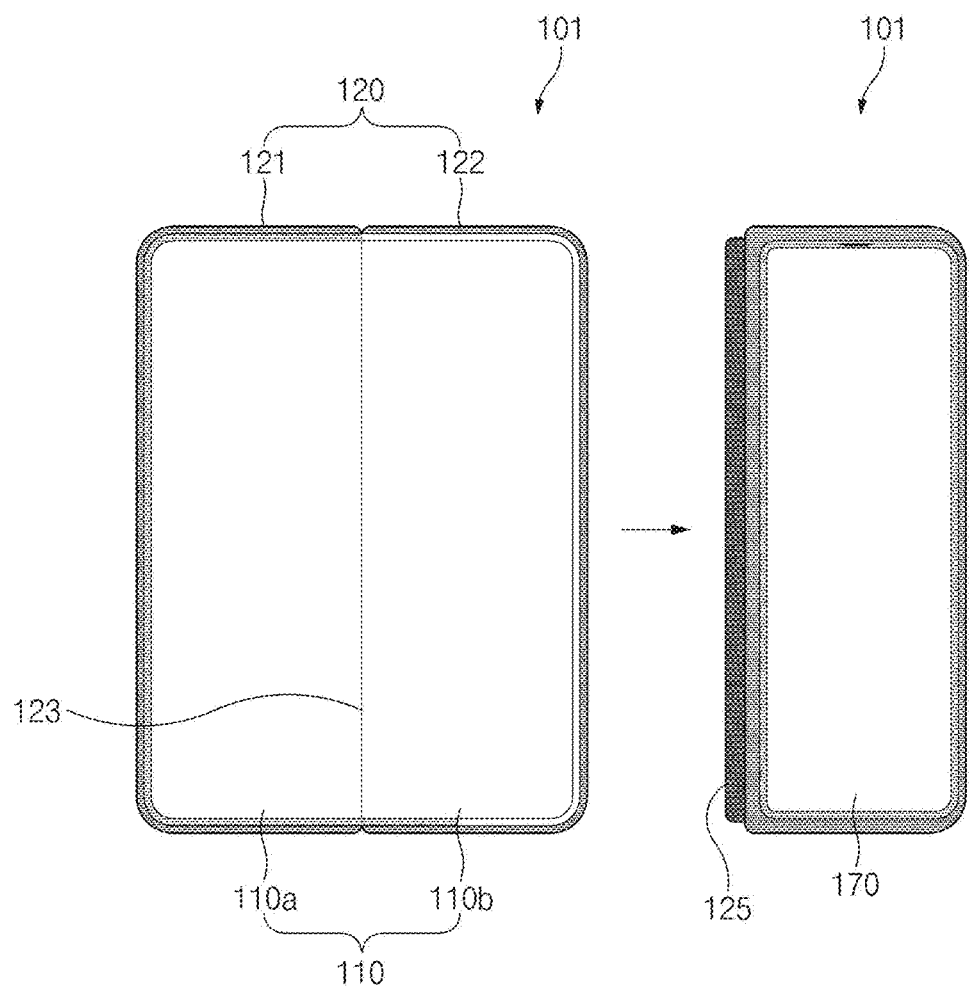
FIG. 1 illustrates a foldable electronic device, according to an embodiment.

Hereinafter, embodiments of the disclosure may be described with reference to accompanying drawings. Accordingly, those of ordinary skill in the art will recognize that modifications, equivalents, and/or alternatives on the embodiments described herein can be variously made without departing from the scope and spirit of the disclosure. With regard to description of drawings, similar components may be marked by similar reference numerals. Descriptions of well-known functions and/or configurations will be omitted for the sake of clarity and conciseness.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

FIG. 1 illustrates a foldable electronic device, according to an embodiment.

Referring to FIG. 1, a foldable electronic device 101 may include a flexible display 110 and a housing 120. The foldable electronic device 101 may be folded about a folding line 123.

The flexible display 110 may be folded about the folding line 123. The folding line 123 may be interposed between a first housing 121 and a second housing 122.

Although FIG. 1 illustrates that the folding line 123 is formed at the central area of the foldable electronic device 101 and the foldable electronic device 101 is folded in a symmetrical shape, the disclosure is not limited thereto. For example, the first housing 121 and the second housing 122 may be folded asymmetrically from each other (e.g., the second housing 122 is larger than the first housing 121). In this case, the folding line 123 may be disposed in an area other than the central area.

The flexible display 110 may include a first display part 110a and a second display part 110b, which may display various contents.

For example, the first display part 110a and the second display part 110b may be unfolded as the housing 120 rotates. In the unfolded state, the first display part 110a and the second display part 110b may form one plane. In the unfolded state, the first display part 110a and the second display part 110b may display unified content (e.g., a web search screen).

The first display part 110a and the second display part 110b may be partially folded to form a specified angle (e.g., about 120 degrees). In the partially folded state, the first display part 110a may display first content (e.g., a web search screen) and the second display part 110b may display second content (e.g., a keyboard).

The first display part 110a and the second display part 110b may be folded as the housing 120 rotates. In the folded state, the first display part 110a and the second display part 110b may be disposed such that display areas thereof overlap each other (symmetrical shape). In the folded state, the first display part 110a and the second display part 110b may be in a screen-off state.

The housing 120 may be folded about the folding line 123. The housing 120 may include a first housing 121 and a second housing 122. The housing 120 may include a folding structure (e.g., a hinge structure) 125 at a part corresponding to the folding line 123. For example, the first housing 121 and the second housing 122 may be unfolded or folded as the hinge structure rotates.

The first housing 121 may be equipped with the first display part 110a. The first display part 110a may rotate as the first housing 121 rotates. The second housing 122 may be equipped with the second display part 110b. The second display part 110b may rotate as the second housing 122 rotates.

Although FIG. 1 illustrates that the first housing 121 and the second housing 122 have the forms symmetrical to each other, the disclosure is not limited thereto. For example, the second housing 122 may be larger than the first housing 121. The first housing 121 and the second housing 122 may be folded asymmetrically from each other. In this case, at least a portion of the second display part 110b mounted in the second housing 122 may be exposed to the outside when the first housing 121 and the second housing 122 are folded. The portion of the second display part 110b, which is exposed to the outside, may not be in the screen-off state when in the folded state.

The foldable electronic device 101 may have various components inside the housing 120, such as a touch panel to recognize a touch, a digitizer to recognize an electronic pen at another layer parallel to the flexible display 110. a processor, a memory, a battery, a printed circuit board (PCB), and a communication circuitry.

The foldable electronic device 101 may include a sub-display 170 which is separately provided. The sub-display 170 may be mounted on a surface opposite to a surface on which the flexible display 110 is mounted, and may operate when the flexible display 110 is folded. The sub-display 170 may have an area smaller than an area of the flexible display 110.

The foldable electronic device 101 may include a plurality of coils. The foldable electronic device 101 may recognize the folding state of the first housing 121 and the second housing 122 (or the folding state of the first display part 110a and the second display part 110b) by using a plurality of coils. The folding state may include at least one of an unfolded state in which the first housing 121 and the second housing 122 are unfolded in a planar form, a folded state in which the first housing 121 and the second housing 122 are folded to make contact with each other, and a partially unfolded state in which the first housing 121 and the second housing 122 are partially folded.

For example, the foldable electronic device 101 may transmit or receive a specified-frequency signal using a first loop coil included in a digitizer panel. The foldable electronic device 101 may receive the signal using a second loop coil included in the digitizer panel and may recognize the folding state of the first housing 121 and the second housing 122 based on the received signal. The foldable electronic device 101 may determine the unfolded state, the folded state, or an angle of the partially-folded state of the first housing 121 and the second housing 122 based on the frequency, the intensity, and the pattern of the received signal.

The foldable electronic device 101 may recognize the folding state of the first housing 121 and the second housing 122, by using a plurality of coils for wireless charging or short-range wireless communication.

Although FIG. 1 illustrates that the first display part 110a and the second display part 110b of the flexible display 110 are folded to face each other, the disclosure is not limited thereto. The foldable electronic device 101 may be folded such that the first display part 110a and the second display part 110b face mutually different surfaces.

Although FIG. 1 illustrates that the foldable electronic device 101 is folded once, the disclosure is not limited thereto. The foldable electronic device 101 may be a multi-foldable device. For example, the foldable electronic device 101 may include a first housing, a second housing, and a third housing. A first folding line may be formed between the first housing and the second housing, and a second folding line may be formed between the second housing and the third housing.

Figure 2:
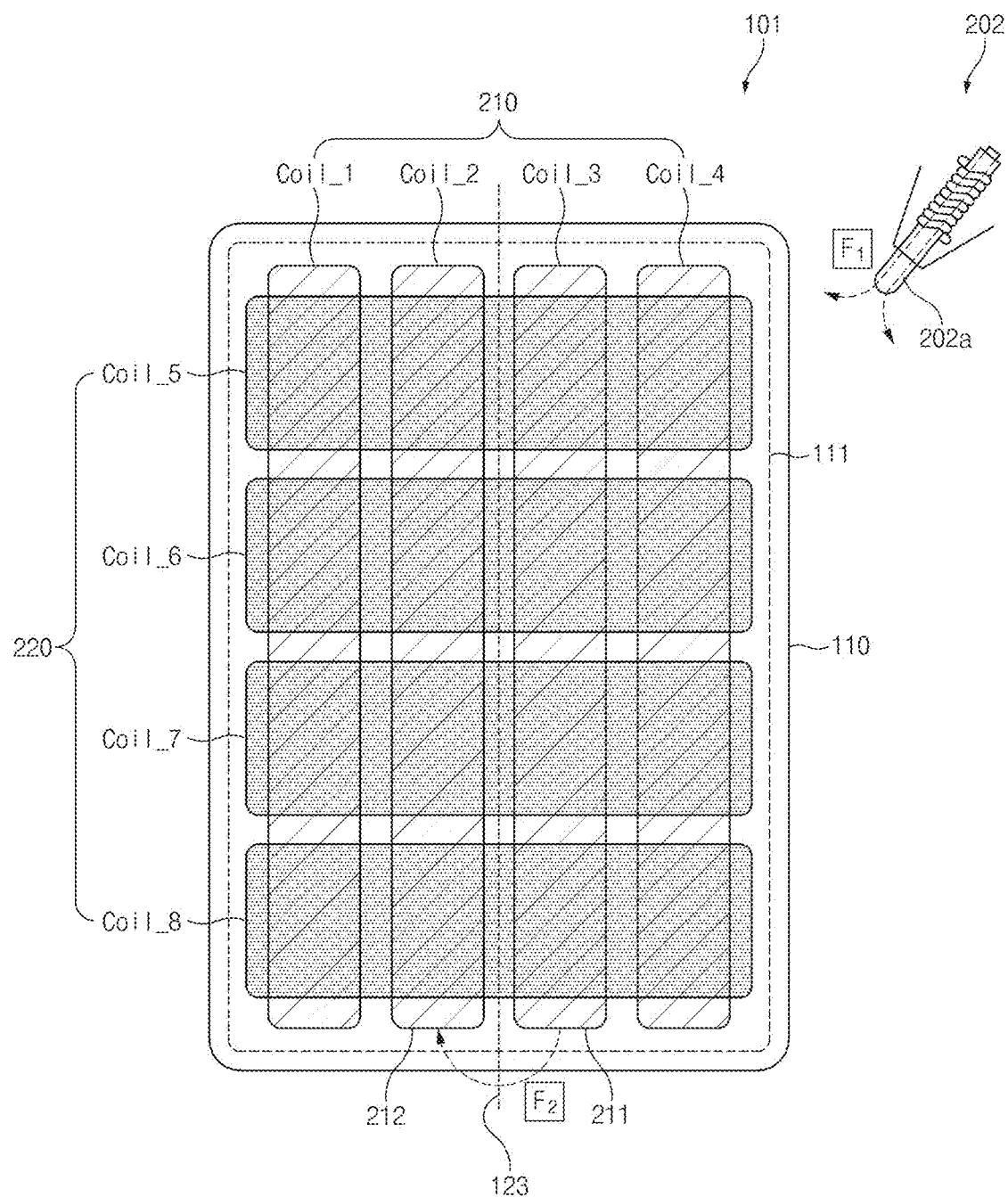
FIG. 2 illustrates a configuration of a sensor panel in a foldable electronic device, according to an embodiment.

FIG. 2 illustrates a configuration of a sensor panel in a foldable electronic device, according to an embodiment.

Referring to FIG. 2, the foldable electronic device 101 may include a sensor panel 111 inside the foldable electronic device 101. For example, the sensor panel 111 may be a digitizer panel to recognize an electronic pen 202.

The sensor panel 111 may be formed at a lower layer of the flexible display 110. The sensor panel 111 may be formed as a foldable flexible PCB (FPCB), in the manner of the flexible display 110.

The sensor panel 111 may include at least one loop coil to generate a magnetic field. The sensor panel 111 may be an EMR digitizer panel to sense the input of the electronic pen 202. The sensor panel 111 may include a plurality of loop coils and a sensor circuitry to perform position tracking for the position of a tip 202a of the electronic pen 202.

The sensor panel 111 may include at least one vertical loop coil 210 and at least one horizontal loop coil 220. The at least one vertical loop coil 210 and the at least one horizontal loop coil 220 may be disposed in a matrix form while crossing each other.

The foldable electronic device 101 may recognize the folding state by using the plurality of loop coils included in the sensor panel 111, which coils may be placed in mutually different housings about the folding line 123. For example, the foldable electronic device 101 may sense the folding state by using at least two of vertical loop coils 210.

The foldable electronic device 101 may operate a first loop coil, which is placed in the second housing 122, of the vertical loop coils 210, as a transmit coil, to transmit a signal to sense the folding state. The foldable electronic device 101 may operate a second loop coil, which is placed in the first housing 121, of the vertical loop coils 210, as a coil (hereinafter, receive coil) to receive a signal to sense the folding state. The following description will be made while focusing on when the transmit coil is placed in the second housing 122 and the receive coil is placed in the first housing 121, but the disclosure is not limited thereto. For example, the transmit coil may be placed in the first housing 121 and the receive coil may be placed in the second housing 122.

For example, a third coil (Coil_3) 211 may be placed in the second housing 122 of the housing 120 and may operate as a transmit coil. A second coil (Coil_2) 212 may be placed in the first housing 121 of the housing 120 and may operate as a receive coil. In the folded state, the transmit coil 211 and the receive coil 212 may be disposed to overlap each other or may be placed within a specified first distance that is determined based on a transmission/reception performance of a magnetic field between the transmit coil 211 and the receive coil 212.

The foldable electronic device 101 may set a frequency of a first resonance signal to sense the operation of the electronic pen 202 and a frequency of the second resonance signal to sense the folding state to mutually different values.

The transmit coil 211 and the receive coil 212 may transmit and receive the first resonance signal of the specified first frequency $F_1$ when the operation of the electronic pen 202 is recognized.

The transmit coil 211 may output the second resonance signal of the specified second frequency $F_2$ when the folding state is sensed. The receive coil 212 may receive the second resonance signal of the second frequency $F_2$ transmitted from the transmit coil 211. The receive coil 212 may transmit the received signal to a controller (or a sensor circuit or a processor) inside the foldable electronic device 101.

For example, the foldable electronic device 101 may set a first resonance signal to sense the operation of the electronic pen 202 to have a first frequency $F_1$ (e.g., 560 kHz), and may set a second resonance signal to sense the folding state to have the second frequency $F_2$ (e.g., 600 kHz) different the first frequency $F_1$ as described below in FIGS. 4A and 4B.

The foldable electronic device 101 may set an intensity of a first resonance signal to sense the operation of the electronic pen 202 and an intensity of the second resonance signal to sense the folding state to mutually different values. The frequency of the first resonance signal may be identical to the frequency of the second resonance signal as described below in FIGS. 5A and 5B.

Figure 3:
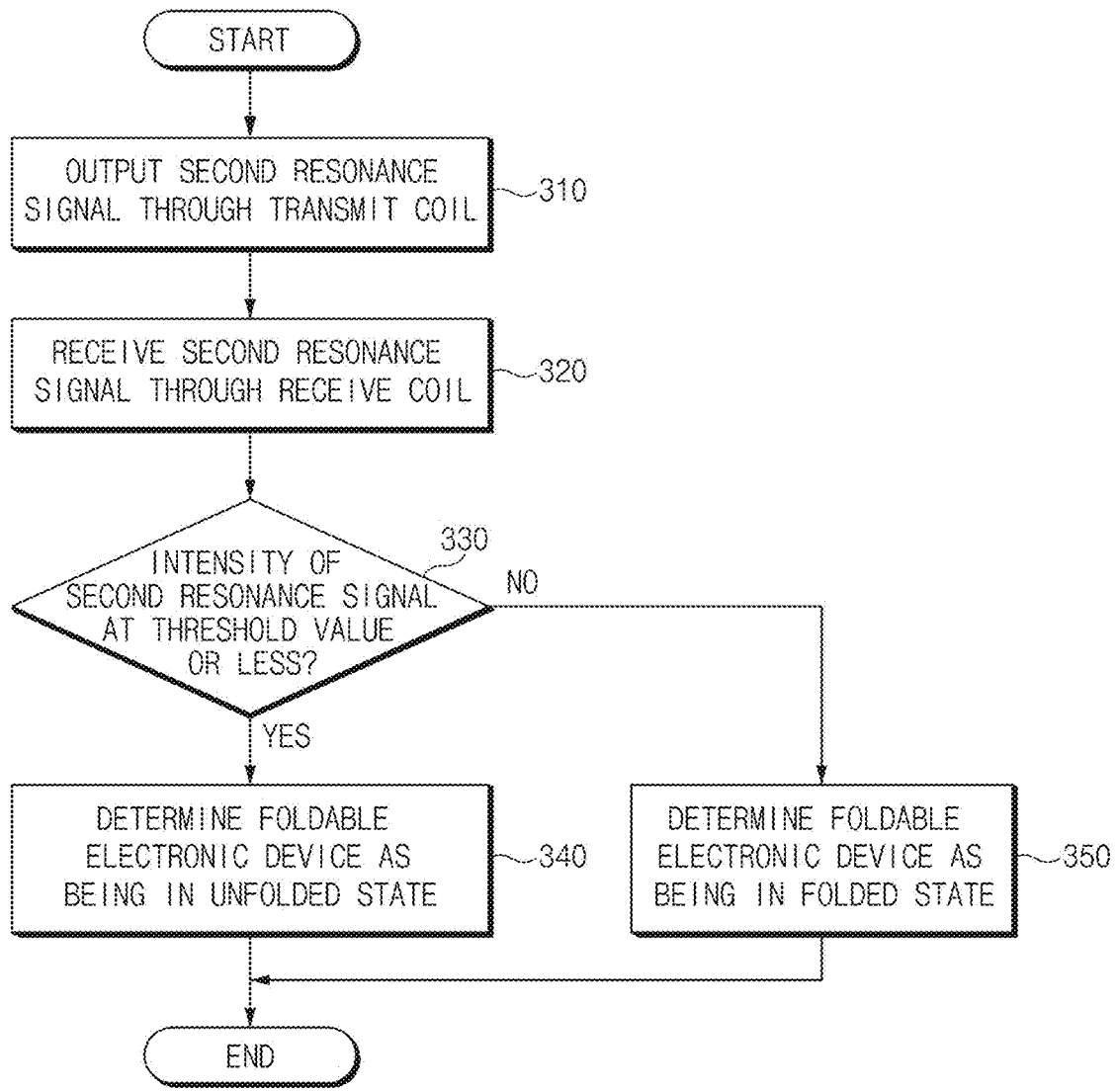
FIG. 3 illustrates a method for recognizing a state of a foldable electronic device, according to an embodiment.

FIG. 3 illustrates a method for recognizing a state of a foldable electronic device, according to an embodiment.

Referring to FIG. 3, in step 310, a processor of the foldable electronic device may output a second resonance signal through the transmit coil 211 of the sensor panel 111. For example, the sensor panel 111 may be an EMR digitizer panel to recognize the electronic pen 202.

In step 320, the processor of the foldable electronic device may receive the second resonance signal through the receive coil 212 of the sensor panel 111.

The transmit coil 211 and the receive coil 212 may be placed in mutually different housings, may have a symmetrical shape, and/or may be placed symmetrically to each other. For example, when the transmit coil 211 is placed in the second housing 122, the receive coil 212 may be placed in the first housing 121. Alternatively, when the transmit coil 211 is placed in the first housing 121, the receive coil 212 may be placed in the second housing 122.

In the folded state, the transmit coil 211 and the receive coil 212 may overlap each other or may be placed within a specified distance.

A plurality of transmit coils 211 and a plurality of receive coils 212 may be provided.

The processor may set the second resonance signal, which is to sense the folding state, to be different from the first resonance signal, which is to sense the operation of the electronic pen 202, in at least one of a frequency, an intensity and a pattern.

In step 330, the processor may determine whether the intensity of the second resonance signal, which is received through the receive coil 212 of the sensor panel 111, is less than or equal to a specified threshold value (or whether the intensity of the second resonance signal is less than the specified threshold value).

In step 340, the processor may determine the foldable electronic device 101 as being in the unfolded state, when the intensity of the received second resonance signal is less than or equal to the specified threshold value (or whether the intensity of the second resonance signal is less than the specified threshold value).

In step 350, the processor may determine the foldable electronic device 101 as being in the folded state, when the intensity of the received second resonance signal is greater than the specified threshold value (or whether the intensity of the second resonance signal is greater than or equal to the specified threshold value).

The processor may compare the received second resonance signal with a plurality of threshold values. The processor may determine the unfolded state, the folded state, or the angle of the partially folded state by using the plurality of threshold values.

Figure 4A:
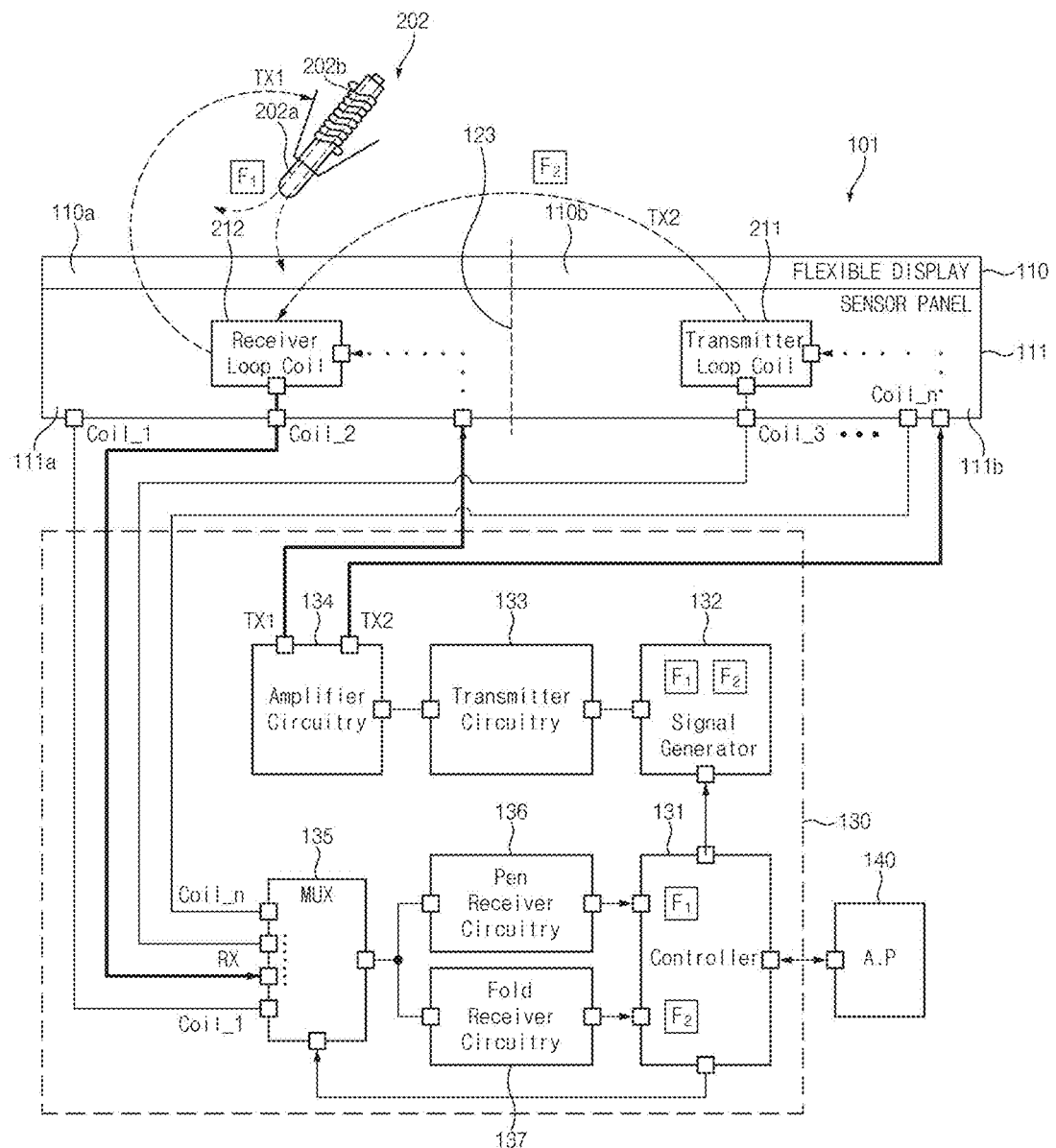
FIG. 4A illustrates a configuration of a foldable electronic device to recognize an operation of an electronic pen and a folding state of the foldable electronic device through resonance signals having mutually different frequencies, according to an embodiment.

FIG. 4A illustrates a configuration of a foldable electronic device to recognize an operation of an electronic pen and a folding state of the foldable electronic device through resonance signals having mutually different frequencies, according to an embodiment.

Referring to FIG. 4A, a foldable electronic device 101 may include a flexible display 110, a sensor panel 111, a sensor circuitry 130, and a processor 140. Although FIG. 4 illustrates the sensor circuitry 130 and the processor 140 as separate components, the disclosure is not limited thereto. For example, the sensor circuitry 130 and the processor 140 may be integrated into one component.

The flexible display 110 may be folded about the folding line 123. The flexible display 110 may include a first display part 110a and a second display part 110b.

The sensor panel 111 may be formed at a lower layer of the flexible display 110 and as an FPCB, in the manner of the flexible display 110. The sensor panel 111 may be folded about the folding line 123, may include a first panel part 111a and a second panel part 111b, and may be an EMR digitizer panel to sense the input of an electronic pen 202.

The sensor panel 111 may include at least a plurality of loop coils to generate a magnetic field. Some of the plurality of loop coils may be used to sense the folding state. The first panel part 111a of the sensor panel 111 may include a receive coil 212 to sense the folding state. The second panel part 111b of the sensor panel 111 may include a transmit coil 211 to sense the folding state.

Although FIG. 4A illustrates that the first panel part 111a includes the receive coil 212 and the second panel part 111b includes the transmit coil 211, the disclosure is not limited thereto. For example, the first panel part 111a may include a transmit coil and the second panel part 111b may include a receive coil.

Each of the transmit coil 211 and the receive coil 212 may include one input terminal and one output terminal.

The sensor circuitry (e.g., electro-magnetic sensor circuitry) 130 may output the first resonance signal and the second resonance signal having mutually different frequencies through the sensor panel 111 and may sense the operation of the electronic pen 202 or the folding state of the foldable electronic device 101. For example, the sensor circuitry 130 may output the first resonance signal having the first frequency $F_1$ to sense the operation of the electronic pen 202 and may output the second resonance signal having the second frequency $F_2$, which is different from the first frequency $F_1$, to sense the folding state of the foldable electronic device 101. The first resonance signal may be transmitted or received through a plurality of loop coils including the transmit coil 211 and the receive coil 212. The second resonance signal may be output through the transmit coil 211 and may be received through the receive coil 212.

The sensor circuitry 130 may include a controller 131, a signal generator 132, transmitter circuitry 133, amplifier circuitry 134, a coupler (e.g., a multiplexer (MUX)) 135, a first signal processor (e.g., a pen signal receiver circuitry or a pen receiver circuitry) 136, and a second signal processor (e.g., a folding signal receiver circuitry or a folding receiver circuitry) 137. The configuration of the sensor circuitry 130 of FIG. 4A is provided for illustrative purposes, but the disclosure is not limited thereto.

The controller 131 may control the signal generator 132, the transmitter circuitry 133, the amplifier circuitry 134, the coupler 135, the first signal processor 136, and the second signal processor 137, and may process a signal received through the sensor panel 111. The controller 131 may transmit the received signal to the processor 140.

The signal generator 132 may generate a specified signal under the control of the controller 131. The first resonance signal to sense the operation of the electronic pen 202 and the second resonance signal to sense the folding signal may be generated based on specified frequencies.

The transmitter circuitry 133 may transmit the first resonance signal or the second resonance signal, which is generated from the signal generator 132, to the amplifier circuitry 134. The amplifier circuitry 134 may change the intensity of the first resonance signal or the second resonance signal which is received from the transmitter circuitry 133.

The coupler 135 may transmit signals received from the plurality of loop coils included in the sensor panel 111 to the first signal processor 136 (i.e., pen receiver circuitry) and the second signal processor 137 (i.e., fold receiver circuitry) under the control of the controller 131. For example, the coupler 135 may transmit the first resonance signal received through the plurality of loop coils (the transmit coil 211, the receive coil 212, and other loop coils) to the first signal processor 136 for the first time duration to recognize the operation of the electronic pen 202, and may transmit the second resonance signal received through the receive coil 212 to the second signal processor 137 for the second time duration to sense the folding state.

The first signal processor 136 may perform transformation (e.g., decoding) for the first resonance signal to sense the operation of the electronic pen 202. The first signal processor 136 may transmit the transformation result of the first resonance signal to the controller 131.

The second signal processor 137 may perform transformation (e.g., decoding) for the second resonance signal to sense the folding state. The second signal processor 137 may transmit the transformation result of the second resonance signal to the controller 131.

Figure 4B:
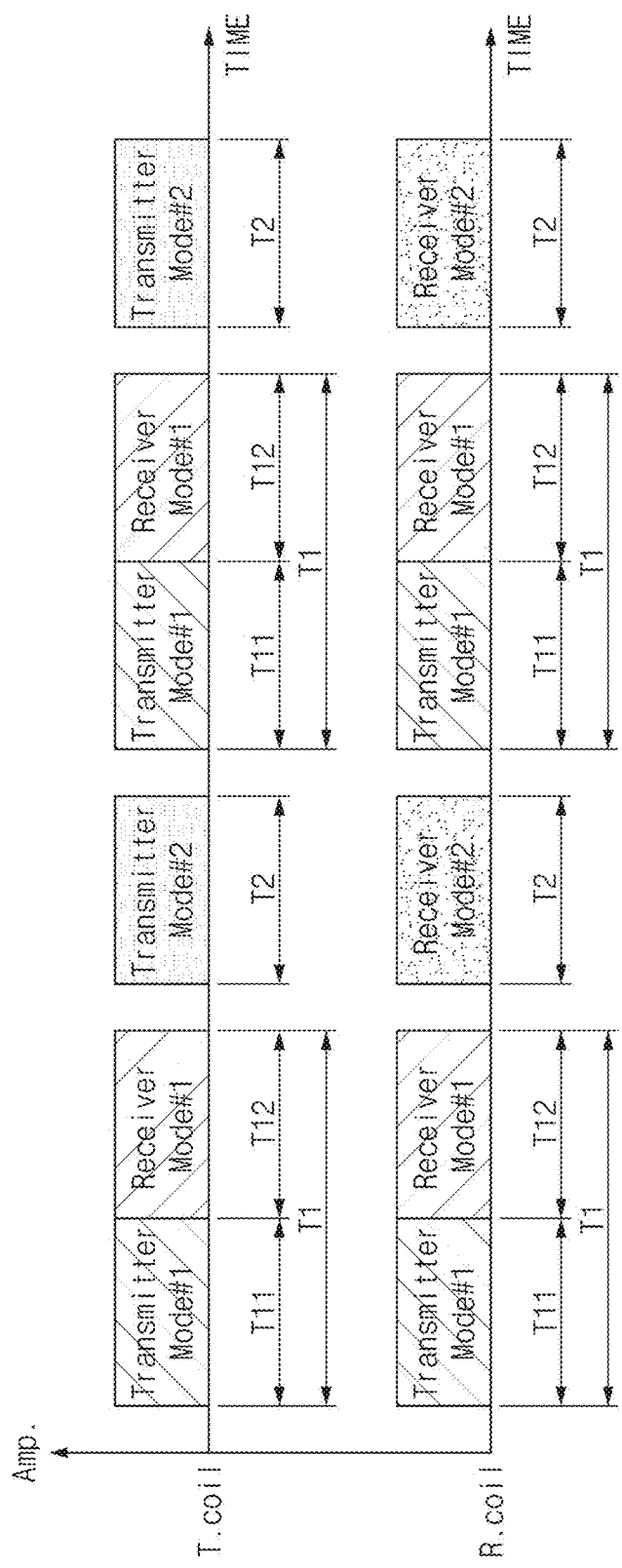
FIG. 4B illustrates a cycle to recognize an operation of an electronic pen and a folding state of a foldable electronic device through resonance signals having mutually different frequencies, according to an embodiment.

FIG. 4B illustrates a cycle to recognize an operation of an electronic pen and a folding state of a foldable electronic device through resonance signals having mutually different frequencies, according to an embodiment.

Referring to FIGS. 4A and 4B, the sensor circuitry 130 may transmit or receive the first resonance signal using a plurality of loop coils (transmit coil 211 and receive coil 212), for a first time duration T1 to recognize the operation of the electronic pen 202. The first resonance signal may have the first frequency $F_1$.

The transmit coil 211 and the receive coil 212 may output the first resonance signal having the specified first frequency, for a first sub-duration T11.

The transmit coil 211 and the receive coil 212 may receive the first resonance signal transmitted based on resonance through an internal coil 202b of the electronic pen 202, for a second sub-time duration T12. Each of the transmit coil 211 and the receive coil 212 may transmit the first resonance signal to the sensor circuitry 130.

The sensor circuitry 130 may output a second resonance signal having a specified second frequency $F_2$ through the transmit coil 211, for the second time duration T2 (e.g., a fold sensing duration) to sense the folding state.

The sensor circuitry 130 may receive the second resonance signal through the receive coil 212 for the second time duration T2. The receive coil 212 may transmit the received signal to the sensor circuitry 130.

The sensor circuitry 130 may change the length of the first time duration T1 or the second time duration T2 depending on the recognition state or the operating state of the electronic pen 202. For example, the sensor circuitry 130 may extend the length of the first time duration T1 when the operation of the electronic pen 202 is sensed (e.g., a drawing or writing state). The sensor circuitry 130 may extend the length of the second time duration T2 when the operation of the electronic pen 202 is not sensed (e.g., the electronic pen 202 is mounted on the housing).

The sensor circuitry 130 may receive information on the use state of the electronic pen 202 from the electronic pen 202 and may change the length of the first time duration T1 or the second time duration T2 based on the received information. The electronic pen 202 may sense the motion of the user using a motion sensor included in the electronic pen 202 and may transmit information on the use state to the sensor circuitry 130. The sensor circuitry 130 may extend the length of the first time duration T1 when the electronic pen 202 is determined as being in the operating state. The sensor circuitry 130 may extend the length of the second time duration T2 when the electronic pen 202 is determined as being in an idle state.

Figure 5A:
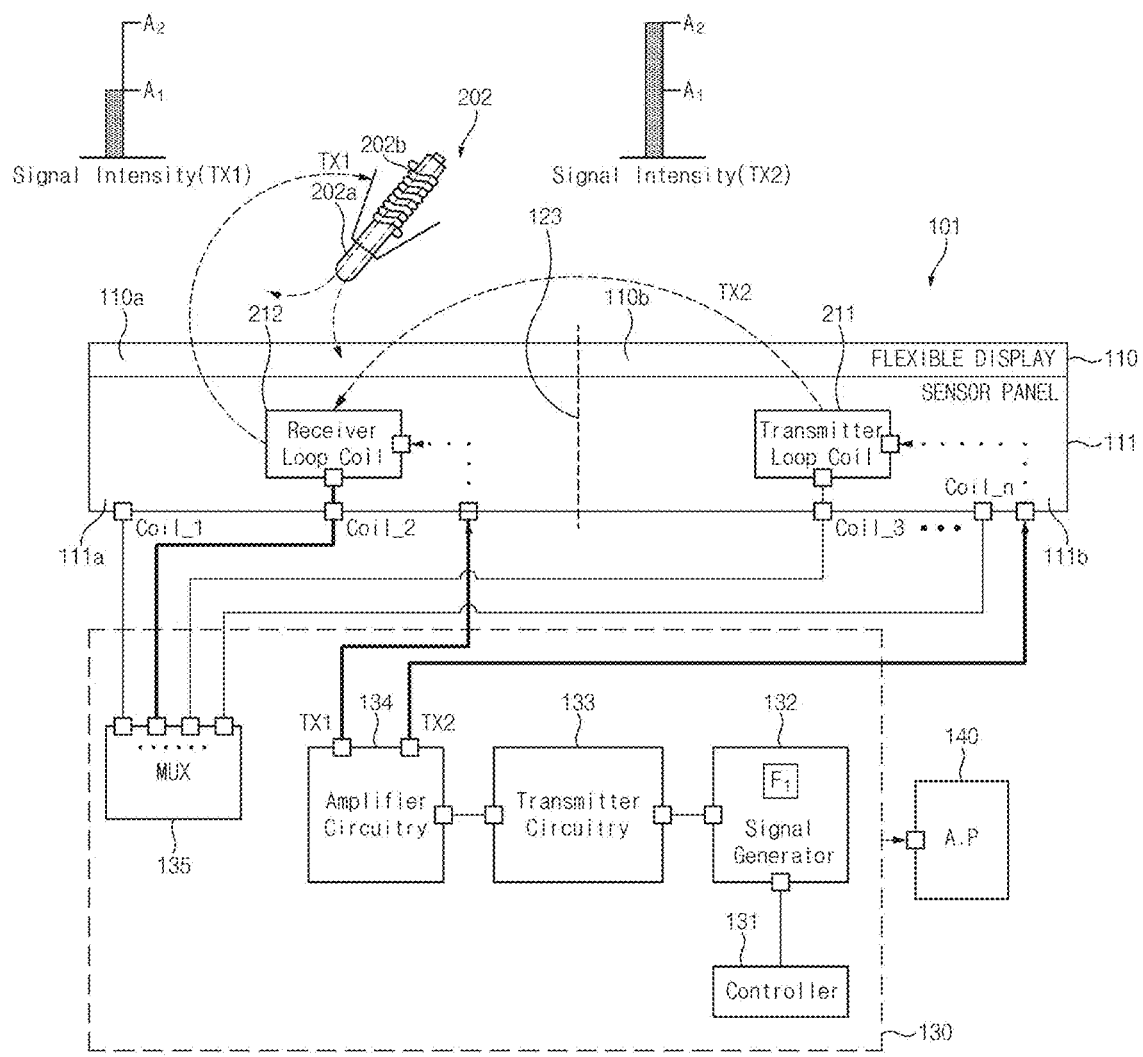
FIG. 5A illustrates a configuration of a foldable electronic device to recognize an operation of an electronic pen and a folding state of the foldable electronic device through resonance signals having mutually different intensities, according to an embodiment.

FIG. 5A illustrates a configuration of a foldable electronic device to recognize an operation of an electronic pen and a folding state of the foldable electronic device through resonance signals having mutually different intensities, according to an embodiment.

Referring to FIG. 5A, a foldable electronic device 101 may include a flexible display 110, a sensor panel 111, a sensor circuitry 130, and a processor 140.

The flexible display 110 may be folded about the folding line 123. The flexible display 110 may include a first display part 110a and a second display part 110b.

The sensor panel 111 may be folded about the folding line 123. The sensor panel 111 may include a first panel part 111a and a second panel part 111b. The sensor panel 111 may be an EMR digitizer panel to sense the input of an electronic pen 202.

The sensor panel 111 may include at least a plurality of loop coils 211 and 212 to generate a magnetic field. Some of the plurality of loop coils may be used to sense the folding state. The first panel part 111a of the sensor panel 111 may include a receive coil 212 to sense the folding state. The second panel part 111b of the sensor panel 111 may include a transmit coil 211 to sense the folding state.

Although FIG. 5A illustrates that the first panel part 111a includes the receive coil 212 and the second panel part 111b includes the transmit coil 211, the disclosure is not limited thereto. For example, the first panel part 111a may include a transmit coil and the second panel part 111b may include a receive coil.

The sensor circuitry 130 may output the first resonance signal and the second resonance signal having mutually different intensities at the same frequency, through the sensor panel 111, to sense the operation of the electronic pen 202 or the folding state of the foldable electronic device 101. For example, the sensor circuitry 130 may output the first resonance signal having a first intensity A1 and the first frequency $F_1$ to sense the operation of the electronic pen 202 and may output the second resonance signal having the second intensity A2 and the first frequency $F_1$ to sense the folding state of the foldable electronic device 101. The first resonance signal may be transmitted or received through a plurality of loop coils including the transmit coil 211 and the receive coil 212. The second resonance signal may be output through the transmit coil 211 and may be received through the receive coil 212.

The second intensity A2 may be greater than the first intensity A1, such as three times greater. The first intensity A1 and the second intensity A2 may be determined based on a terminal intensity or a communication environment.

The signal generator 132 may generate a resonance signal having the first frequency $F_1$ under the control of the controller 131. The transmitter 133 may transmit the resonance signal, which is generated by the signal generator 132, to the amplifier circuitry 134.

The amplifier circuitry 134 may generate the first resonance signal by amplifying the first resonance signal to have the first intensity A1 for the first time duration under the control of the controller 131. The amplifier circuitry 134 may generate the first resonance signal by amplifying the resonance signal to have the second intensity A2 for the first time duration under the control of the controller 131.

Figure 5B:
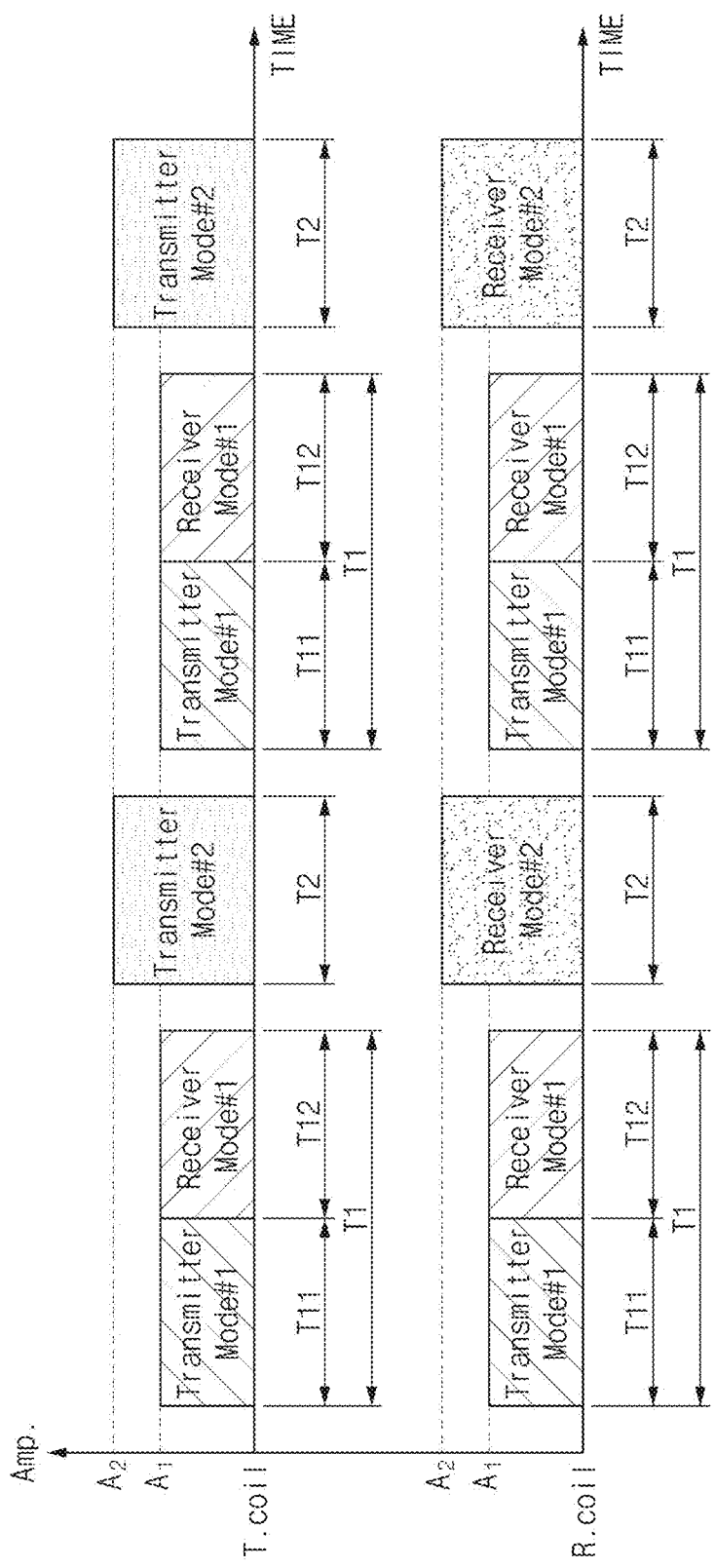
FIG. 5B illustrates a cycle to recognize an operation of an electronic pen and a folding state of the foldable electronic device through resonance signals having mutually different frequencies, according to an embodiment.

FIG. 5B illustrates a cycle to recognize an operation of an electronic pen and a folding state of a foldable electronic device through resonance signals having mutually different frequencies, according to an embodiment.

Referring to FIGS. 5A and 5B, the sensor circuitry 130 may transmit or receive the first resonance signal using a plurality of loop coils 211 and 212, for a first time duration T1 to recognize the operation of the electronic pen 202. The first resonance signal may have the first intensity A1.

The transmit coil 211 and the receive coil 212 may output the first resonance signal having the specified first frequency A1, for a first sub-duration T11.

The transmit coil 211 and the receive coil 212 may receive the first resonance signal transmitted based on resonance through an internal coil 202b of the electronic pen 202, for the second sub-time duration T12. Each of the transmit coil 211 and the receive coil 212 may transmit the received first resonance signal to the sensor circuitry 130.

The sensor circuitry 130 may output a second resonance signal having a specified second frequency A2 through the transmit coil 211, for the second time duration T2 to sense the folding state.

The sensor circuitry 130 may receive the second resonance signal through the receive coil 212 for the second time duration T2. The receive coil 212 may transmit the received signal to the sensor circuitry 130.

The sensor circuitry 130 may change the length of the first time duration T1 or the second time duration T2 depending on the recognition state or the operating state of the electronic pen 202. For example, the sensor circuitry 130 may extend the length of the first time duration T1 when the operation of the electronic pen 202 is sensed, or may extend the length of the second time duration T2 when the operation of the electronic pen 202 is not sensed.

Figure 6:
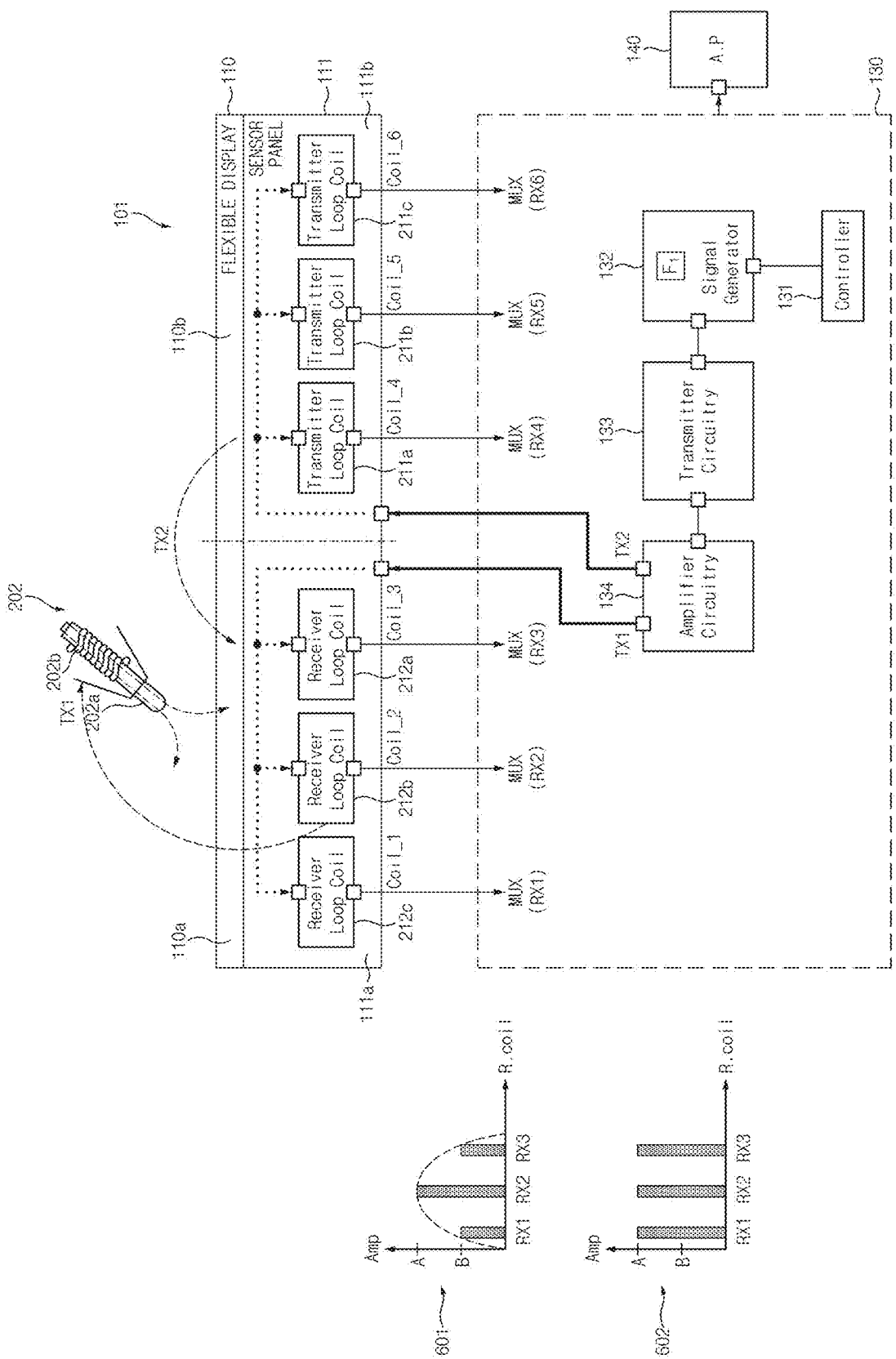
FIG. 6 illustrates a configuration of a foldable electronic device to recognize an operation of an electronic pen and a folding state of the foldable electronic device using a plurality of transmit coils or a plurality of receive coils, according to an embodiment.

FIG. 6 illustrates the configuration of a foldable electronic device to recognize an operation of an electronic pen and a folding state of the foldable electronic device using a plurality of transmit coils or a plurality of receive coils, according to an embodiment.

Referring to FIG. 6, a foldable electronic device 101 may include a flexible display 110, a sensor panel 111, a sensor circuitry 130, and a processor 140.

The flexible display 110 may be folded about the folding line 123. The flexible display 110 may include a first display part 110a and a second display part 110b.

The sensor panel 111 may be folded about the folding line 123. The sensor panel 111 may include a first panel part 111a and a second panel part 111b. The sensor panel 111 may be an EMR digitizer panel to sense the input of an electronic pen 202.

The sensor panel 111 may include at least a plurality of loop coils to generate a magnetic field. Some or all of the plurality of loop coils may be used to sense the folding state. The first panel part 111a of the sensor panel 111 may include a plurality of receive coils 212a, 212b, and 212c to sense the folding state. The plurality of receive coils 212a, 212b, and 212c may be all loop coils included in the first panel part 111a.

The second panel part 111b of the sensor panel 111 may include a plurality of receive coils 211a, 211b, and 211c to sense the folding state. The plurality of receive coils 211a, 211b, and 211c may be all loop coils included in the first panel part 111a.

Although FIG. 6 illustrates that the first panel part 111a may include a plurality of receive coils 212a, 212b, and 212c, and the second panel part 111b includes a plurality of transmit coils 211a, 211b and 211c, the disclosure is not limited thereto. For example, the first panel part 111a may include transmit coils and the second panel part 111b may include receive coils.

The sensor circuitry 130 may output the first resonance signal or the second resonance signal having the same frequency and the same intensity through the sensor panel 111 to sense the operation or the folding state of the electronic pen 202 based on the pattern of the received signal.

For example, when intensities of signals received through the plurality of receive coils 212a, 212b, and 212c have a first pattern 601 corresponding to a normal distribution or a Gaussian distribution, the sensor circuitry 130 may recognize and process the received signal as the operation of the electronic pen 202. Alternatively, when intensities of signals received through the plurality of receive coils 212a, 212b, and 212c have a second pattern 602 corresponding to a uniform distribution or a specified range, the sensor circuitry 130 may recognize and process the received signal as a signal corresponding to the folding state.

Figure 7A:
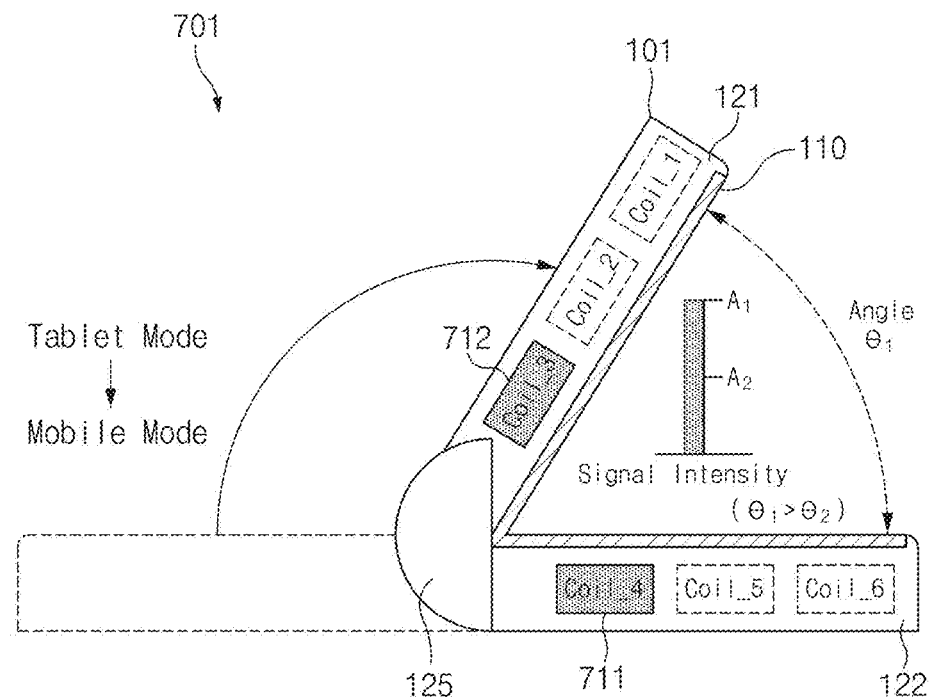
FIG. 7A illustrates a foldable electronic device recognizing a folding state by using second resonance signals having different intensities, according to an embodiment.
Figure 7A:
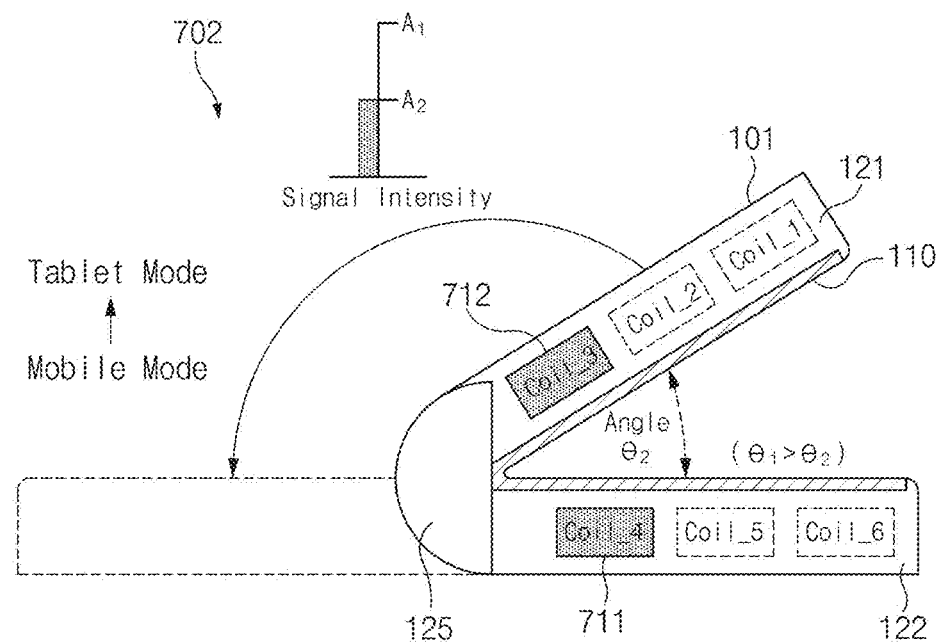

FIG. 7A illustrates a foldable electronic device recognizing a folding state by using second resonance signals having different intensities according to an embodiment.

Referring to FIG. 7A, the foldable electronic device 101 may be changed from being in the unfolded state to being in the folded state, in a first state 701. In this manner, the foldable electronic device 101 changes from a tablet mode to a mobile mode, when fully folded. The foldable electronic device 101 may recognize that the foldable electronic device 101 is folded, using the second resonance signal having the first intensity A1, in the first state 701. The foldable electronic device 101 may transmit the second resonance signal having the first intensity A1 through the transmit coil 711 and receive the second resonance signal through the receive coil 712 to recognize the folded state.

The foldable electronic device 101 may be changed from being in the folded state to being in the unfolded state, in the second state 702. In this manner, the foldable electronic device 101 changes from the mobile mode to the tablet mode, when fully unfolded. The foldable electronic device 101 may recognize that the foldable electronic device 101 is unfolded, using the second resonance signal having the second intensity A2 less than the first intensity A1, in the second state 702. The foldable electronic device 101 may transmit the second resonance signal having the second intensity A2 through the transmit coil 711 and receive the second resonance signal through the receive coil 712 to recognize the unfolded state.

The folding angle (e.g., θ1) sensed in the first state 701 may be greater than the folding angle (e.g., θ2) sensed in the second state 702. The foldable electronic device 101 may rapidly sense the state variation by outputting second resonance signal having mutually different intensities in the unfolding procedure and the folding procedure.

Figure 7B:
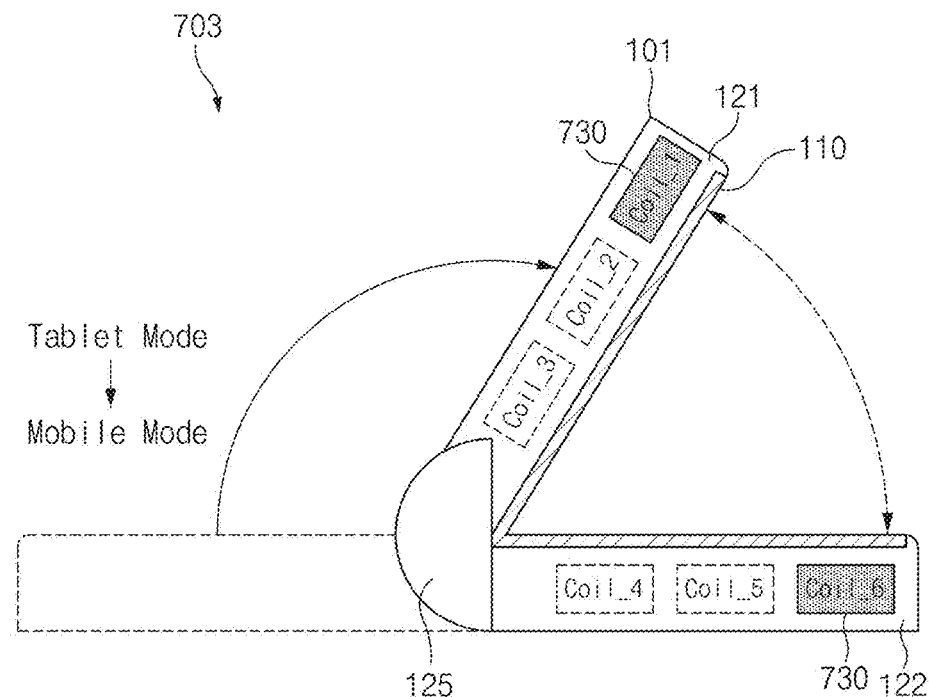
FIG. 7B illustrates a configuration of a foldable electronic device to recognize a folding state by using mutually different pairs of coils, according to an embodiment.
Figure 7B:
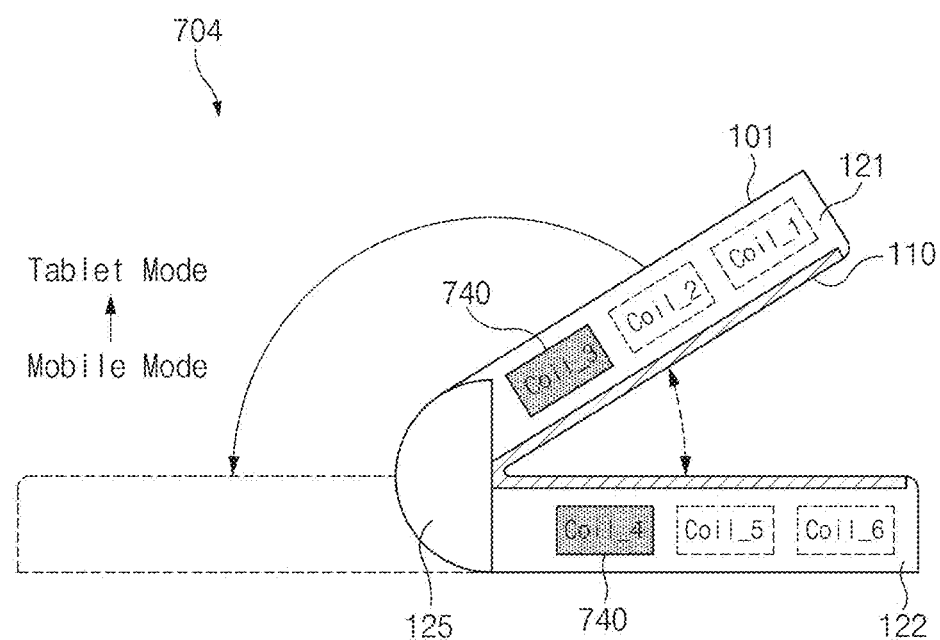

FIG. 7B illustrates a configuration of a foldable electronic device to recognize a folding state by using mutually different pairs of coils, according to embodiments.

Referring to FIG. 7B, the foldable electronic device 101 may be changed from being in the unfolded state to being in the folded state, in the first state 703. In this manner, the foldable electronic device 101 changes from a tablet mode to a mobile mode, when fully folded. In the first state 703, the foldable electronic device 101 may recognize the folded state of the foldable electronic device 101 using a pair (hereinafter, an edge coil pair) 730 of coils provided closely to an edge of the first housing 121 and the second housing 122.

The foldable electronic device 101 may transmit or receive the second resonance signal through the edge coil pair 730 of coils to recognize the folded state. The edge coil pair 730 of coils may be disposed farther away from each other in the unfolded state, or may be disposed in a manner rendering it difficult to transmit or receive a resonance signal. The foldable electronic device 101 may more rapidly recognize the folded state using the second resonance signal having a higher intensity.

The foldable electronic device 101 may be changed from being in the folded state to being in the unfolded state, in the second state 704. In this manner, the foldable electronic device 101 changes from the mobile mode to the tablet mode, when fully unfolded. The foldable electronic device 101 may recognize the folding state, by using a center coil pair 740 of coils disposed more closely to the folding structure (e.g., a hinge) 125, in the second state 704.

The foldable electronic device 101 may transmit or receive the second resonance signal through the center coil pair 740 of coils to recognize the state that the foldable electronic device 101 is unfolded. The center coil pair 740 of coils may be disposed closely to each other in the folded state. The foldable electronic device 101 may more rapidly recognize the unfolded state using the second resonance signal having a lower intensity.

Although FIG. 7B illustrates that the edge coil pair 730 of coils are used when the unfolded state is changed to the folded state, and the center coil pair 740 of coils are used when the folded state is changed to the unfolded state, the disclosure is not limited thereto. For example, the center coil pair 740 of coils may be used when the unfolded state is changed to folded state, and the edge coil pair 730 of coils may be used when the folded state is changed to the unfolded state.

When the angle between the first housing 121 and the second housing 122 is within a first angle (e.g., 90 degrees), the edge coil pair 730 of coils are used, and when the angle between the first housing 121 and the second housing 122 is greater than the first angle (e.g., 90 degrees), the center coil pair 740 of coils may be used. For example, the foldable electronic device 101 may recognize the angle between the first housing 121 and the second housing 122 by using the center coil pair 740 of coils when the unfolded state is changed to the folded state, and may recognize the angle between the first housing 121 and the second housing 122 by using the edge coil pair 730 of coils when the angle between the first housing 121 and the second housing 122 is changed to be within 90 degrees. For example, the foldable electronic device 101 may recognize the angle between the first housing 121 and the second housing 122 by using the edge coil pair 730 of coils when the folded state is changed to the unfolded state, and may recognize the angle between the first housing 121 and the second housing 122 by using the center coil pair 740 of coils when the angle between the first housing 121 and the second housing 122 is changed to be greater than 90 degrees.

Figure 8:
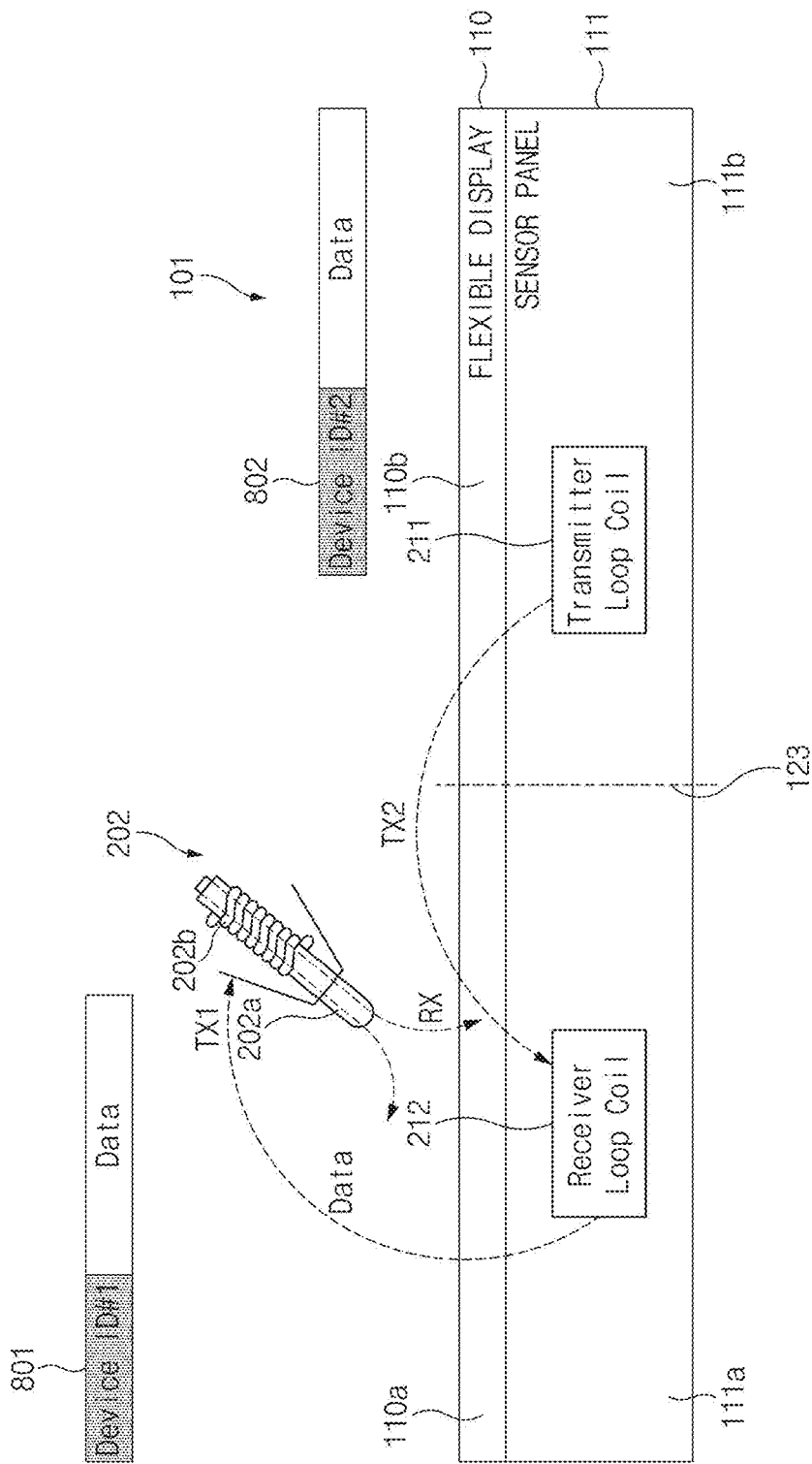
FIG. 8 illustrates a configuration of a foldable electronic device to recognize an operation of an electronic pen and a folding state of the foldable electronic device using identification information, according to an embodiment.

FIG. 8 illustrates a configuration of a foldable electronic device to recognize an operation of an electronic pen and a folding state of the foldable electronic device using identification information, according to an embodiment.

Referring to FIG. 8, a foldable electronic device 101 may include a flexible display 110 and a sensor panel 111.

The flexible display 110 may be folded about the folding line 123. The flexible display 110 may include a first display part 110a and a second display part 110b.

A sensor panel 111 may be formed at a lower layer of the flexible display 110. The sensor panel 111 may be formed as an FPCB. The sensor panel 111 may be folded about the folding line 123. The sensor panel 111 may include a first panel part 111a and a second panel part 111b. The sensor panel 111 may be an EMR digitizer panel to sense the input of an electronic pen 202.

The sensor panel 111 may include at least a plurality of loop coils to generate a magnetic field. Some of the plurality of loop coils may be used to sense the folding state. The first panel part 111a of the sensor panel 111 may include a receive coil 212 to sense the folding state. The second panel part 111b of the sensor panel 111 may include a transmit coil 211 to sense the folding state.

Although FIG. 8A illustrates that the first panel part 111a includes the receive coil 212 and the second panel part 111b includes the transmit coil 211, the disclosure is not limited thereto. For example, the first panel part 111a may include the transmit coil and the second panel part 111b may include the receive coil.

The sensor panel 111 may sense the operation of the electronic pen 202 using the first transmission packet 801 having the first identification (ID) information ID #1. For example, the transmit coil 211 or the receive coil 212 may transmit a first transmit packet 801 containing ID #1 of the electronic pen 202 in the header of the first transmit packet. The transmit coil 211 or the receive coil 212 may receive a packet containing ID #1 of the electronic pen 202 in a header of the packet. The transmit coil 211 or the receive coil 212 may transfer the received packet to the sensor circuitry 130. The sensor circuitry 130 may recognize the operation of the electronic pen 202 based on the received packet.

The sensor panel 111 may sense the folding state using a first transmit packet 802 having second ID information ID #2. For example, the transmit coil 211 may transmit a second transmit packet 802 containing ID #2 of the foldable electronic device 101 in the header of the second transmit packet. The receive coil 212 may receive a packet containing ID #2 of the foldable electronic device 101 in a header of the packet. The receive coil 212 may transmit the received packet to the sensor circuitry 130. The sensor circuitry 130 may recognize the folding state based on the received packet.

When a first foldable electronic device and a second foldable electronic device are placed close to each other, each foldable electronic device may perform various operations based on ID information received through the relevant receive coil of the foldable electronic device. For example, when the first foldable electronic device receives a packet containing the ID of the first foldable electronic device through the receive coil, the first foldable electronic device may recognize the folding state based on the received packet. When the first foldable electronic device receives a packet containing the ID of the second foldable electronic device through the receive coil, the first foldable electronic device attempts the pairing with the second foldable electronic device or performs wireless charging based on the received packet.

Figure 9:
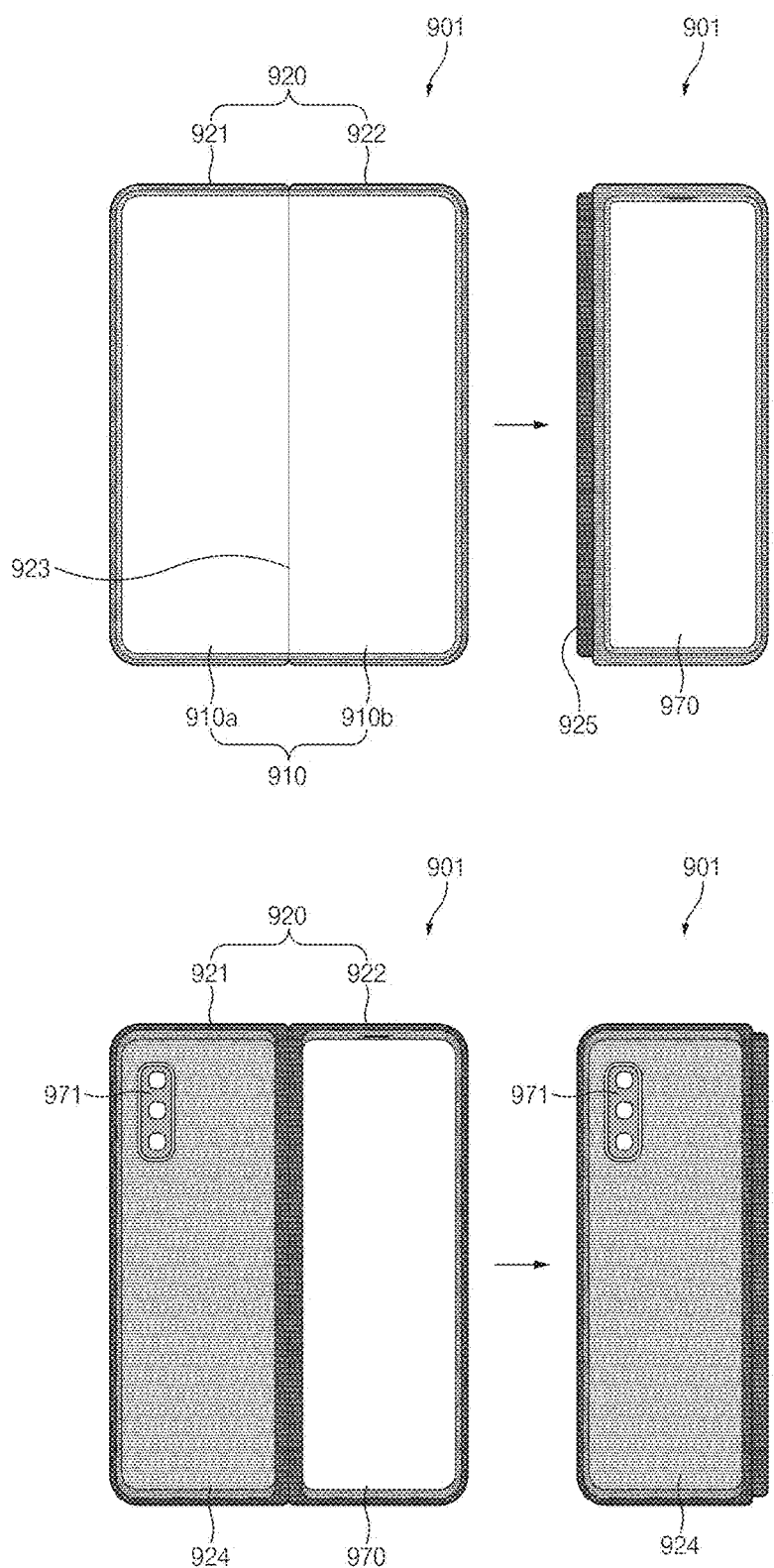
FIG. 9 illustrates an outer appearance of a foldable electronic device, according to an embodiment.

FIG. 9 illustrates an outer appearance of a foldable electronic device, according to an embodiment.

Referring to FIG. 9, a foldable electronic device 901 may include a flexible display 910 and a housing 920. The foldable electronic device 901 may be folded about a folding line 923.

The flexible display 910 may be folded about the folding line 923. The flexible display 910 may include a first display part 910a and a second display part 910b. The first display part 910a and the second display part 910b may display various contents.

For example, the first display part 910a and the second display part 910b may be unfolded as a folding structure (e.g., a hinge) 925 rotates. In the unfolded state, the first display part 910a and the second display part 910b may form one plane. In the unfolded state, the first display part 910a and the second display part 910b may display unified content (e.g., a web search screen).

The housing 920 may be folded about the folding line 923. The housing 920 may include a first housing 921 and a second housing 922. The housing 920 may include a hinge structure 925 at a part corresponding to the folding line 923. For example, the first housing 921 and the second housing 922 may be unfolded or folded as the hinge rotates.

The first housing 921 may be equipped with the first display part 910a. The first display part 910a may rotate as the first housing 921 rotates. The second housing 922 may be equipped with the second display part 910b. The second display part 910b may rotate as the second housing 922 rotates.

The foldable electronic device 901 may include a sub-display 970 separately provided on a surface opposite to a surface on which the flexible display 910 is mounted. The sub-display 970 may be mounted on the back surface of the first housing 921 and may operate when the flexible display 910 is folded. The sub-display 970 may have an area smaller than an area of the flexible display 910. The sub-display 970 may not be in a flexible form.

The foldable electronic device 901 may include a rear case 924 separately provided on a surface opposite to a surface on which the flexible display 910 is mounted. The rear case 924 may be mounted on the back surface of the second housing 922.

The foldable electronic device 901 may include a camera module 971 which is exposed through the rear case 924, on the surface opposite to the surface on which the flexible display 910 is mounted. The camera module 971 may be mounted on the back surface of the second housing 922. A separate display may not be mounted on the back surface of the second housing 922.

Figure 10:
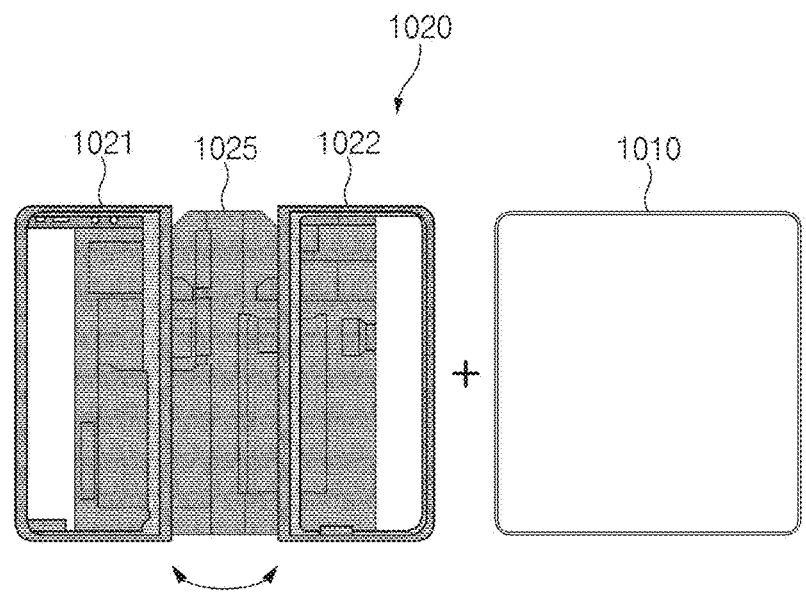
FIG. 10 illustrates a housing structure of a foldable electronic device, according to an embodiment.

FIG. 10 illustrates a housing structure of a foldable electronic device, according to an embodiment.

Referring to FIG. 10, a housing 1020 may include a hinge structure 1025, which is able to change the folding state to an unfolded state or a folded state, and a first housing 1021 and a second housing 1022 coupled to opposite side surfaces of the hinge structure 1025. The housing 1020 may be folded or unfolded as the hinge structure 1025 rotates. The first housing 1021 and the second housing 1022 may be mounted with a flexible display 1010. The first housing 1021 may be mounted with a separate sub-display on a surface opposite to the surface on which the flexible display 1010 is mounted.

The flexible display 1010 and the sub-display are provided in the type of a rectangle having a curved corner and as an infinity display having a narrow bezel.

Figure 11:
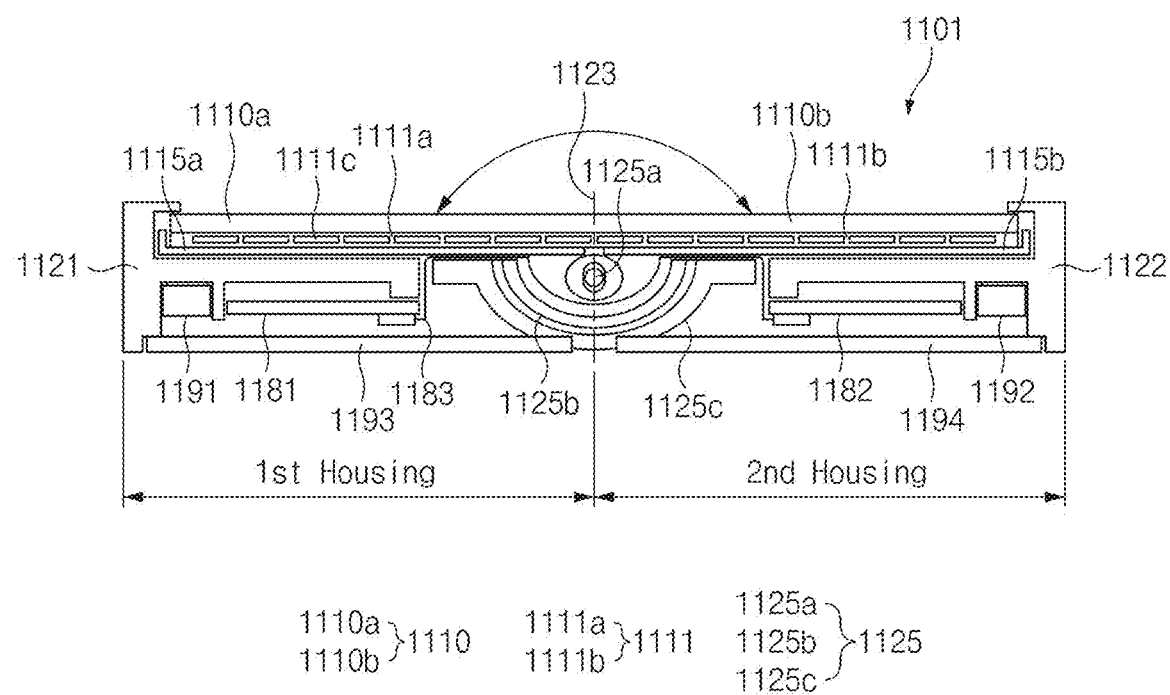
FIG. 11 is a cross-sectional view illustrating a foldable electronic device, according to an embodiment.

FIG. 11 is a cross-sectional view illustrating a foldable electronic device, according to an embodiment.

Referring to FIG. 11, a foldable electronic device 1101 may include a flexible display 1110, a sensor panel 1111, a first bracket 1115a, a second bracket 1115b, a folding structure 1125, a first housing 1121, a second housing 1122, a first PCB 1181, a second PCB 1182, an FPCB 1183, a first haptic driver 1191, a second haptic driver 1192, a first cover 1193, and a second cover 1194.

The flexible display 1110 may be folded about the folding line 1123. The flexible display 1110 may include a first display part 1110a and a second display part 1110b.

The sensor panel 1111 may be formed at a lower layer of the flexible display 1110 as an FPCB. The sensor panel 1111 may include a first panel part 1111a and a second panel part 1111b.

The first bracket 1115a and the second bracket 1115b may be disposed on the back surface of the flexible display 1110 and the sensor panel 1111. The first bracket 1115a and the second bracket 1115b may support the flexible display 1110 and the sensor panel 1111.

The folding structure 1125 may be disposed in the central area of the flexible display 1110 or the sensor panel 1111. The flexible display 1110 may be folded or unfolded as the folding structure 1125 rotates. The folding structure 1125 may include a hinge 1125a, a pivoting hinge 1125b, and a hinge case 1125c.

The first housing 1121 and the second housing 1122 may support the flexible display 1110, the sensor panel 1111, and the bracket 1115, and form the side appearance of the foldable electronic device 1101. The first housing 1121 and the second housing 1122 may be provided in a form symmetrical to each other.

The first PCB 1181 may be disposed in the first housing 1121. The first PCB 1181 may process an electrical signal associated with a component disposed in the first housing 1121.

The second PCB 1182 may be disposed in the second housing 1122. The second PCB 1182 may process an electrical signal associated with a component disposed in the second housing 1122.

The FPCB 1183 may electrically connect the first PCB 1181 with the second PCB 1182. The first haptic driver 1191 and the second haptic driver 1192 may generate a haptic signal. The first cover 1193 and the second cover 1194 may protect the back surface of the foldable electronic device 1101.

Figure 12:
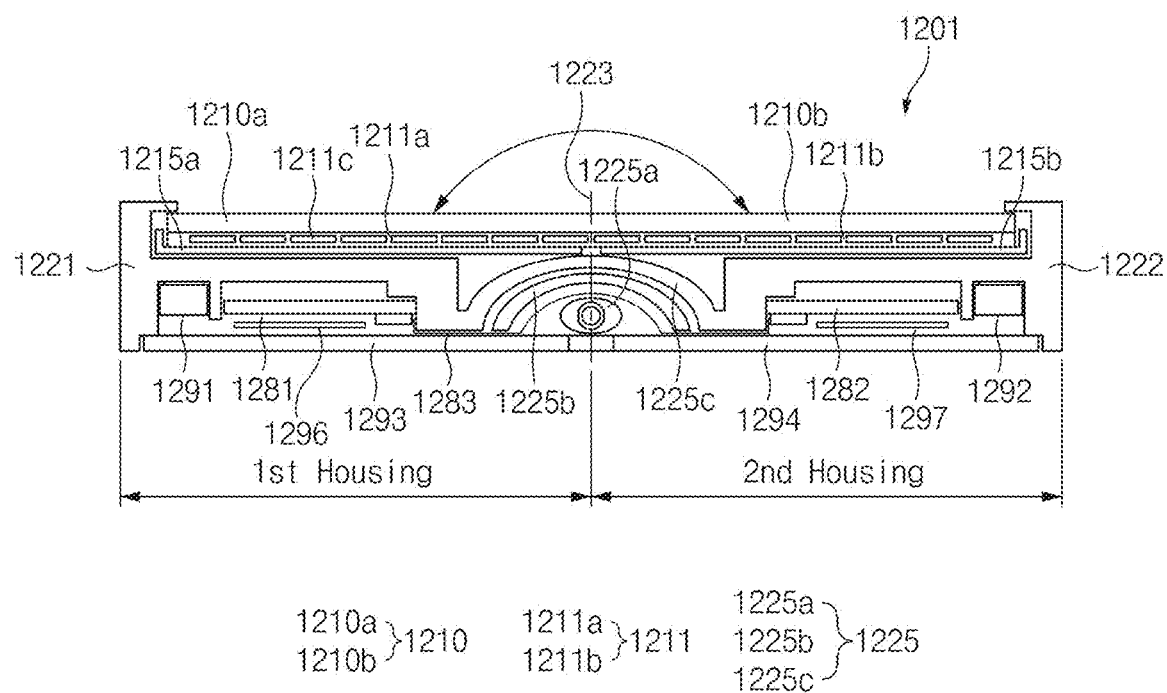
FIG. 12 is a cross-sectional surface illustrating a foldable electronic device in an out-folding type, according to an embodiment.

FIG. 12 is a cross-sectional surface illustrating a foldable electronic device in an out-folding type, according to an embodiment.

Referring to FIG. 12, a foldable electronic device 1201 may be folded such that the flexible display 1210 is exposed to the outside, which is different from the foldable electronic device 1101 of FIG. 11.

The foldable electronic device 1201 may include a flexible display 1210, a sensor panel 1211, a first bracket 1215a, a second bracket 1215b, a folding structure 1225, a first housing 1221, a second housing 1222, a first PCB 1281, a second PCB 1282, an FPCB 1283, a first haptic driver 1291, a second haptic driver 1292, a first cover 1293, and a second cover 1294.

The function or the operation of each component of the foldable electronic device 1201 is the same as or similar to the relevant function or operation of the foldable electronic device 1101 of FIG. 11.

The folding structure 1225 may be disposed in the central area of the flexible display 1210 or the sensor panel 1211. The flexible display 1210 may be folded or unfolded as the folding structure 1225 rotates. The folding structure 1225 may include a hinge 1225*a*, a pivoting hinge 1225*b*, and a hinge case 1225*c*.

The folding structure 1225 may be disposed to face a direction opposite to a direction in which the folding structure 1125 of FIG. 11 faces. The hinge 1225*a* of the folding structure 1225 may face the first cover 1293 and the second cover 1294. The flexible display 1210 may be folded to be exposed to the outside as the folding structure 1225 rotates.

The foldable electronic device 1201 may include a first coil 1296 and a second coil 1297 in a space adjacent to the first cover 1293 and the second cover 1294. For example, the first coil 1296 and the second coil 1297 may be for short-range wireless communication or wireless charging.

The foldable electronic device 1201 may recognize the folding state of the first housing 1221 and the second housing 1222 (or the folding state of the first display part 1210*a* and the second display part 1210*b*) by using the first coil 1296 and the second coil 1297.

For example, the foldable electronic device 1201 may transmit a specified frequency signal using the first coil 1296. The foldable electronic device 1201 may receive the signal using a second coil 1297, and may recognize the folding state of the first housing 1221 and the second housing 1222 based on the received signal. The foldable electronic device 1201 may determine the unfolded state, the folded state, or an angle of the partially-folded state of the first housing 1221 and the second housing 1222 based on the frequency, the intensity, and the pattern of the received signal. Various manners of recognizing the folding state in the FIGS. 2 to 8 may be applied to recognizing the folding state using the first coil 1296 and the second coil 1297.

Figure 13:
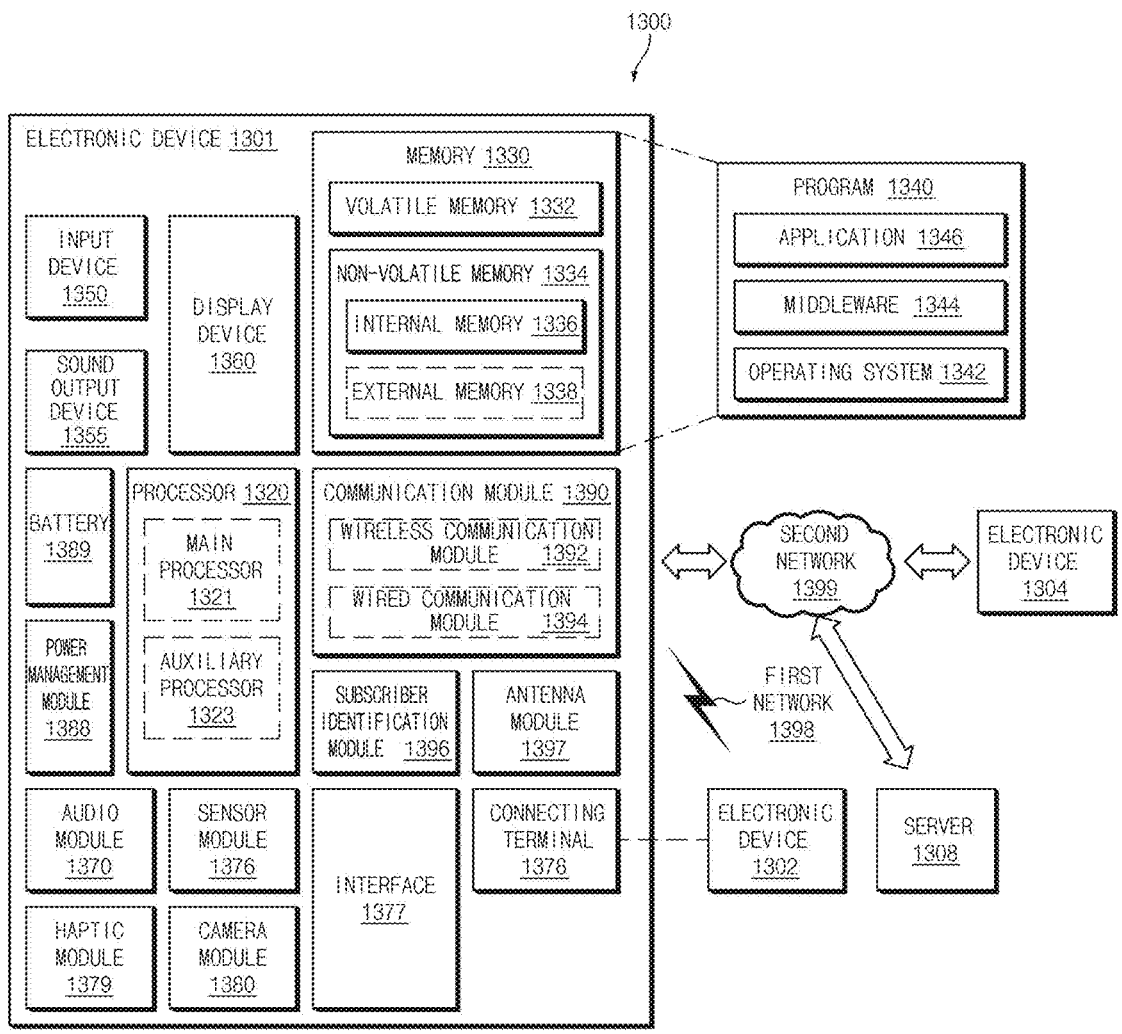
FIG. 13 illustrates a block diagram of an electronic device under a network environment, according to an embodiment.

FIG. 13 is a block diagram illustrating an electronic device 1301 in a network environment 1300 according to various embodiments. An electronic device according to various embodiments of the disclosure may include various forms of devices. For example, the electronic device may include at least one of, for example, portable communication devices (e.g., smartphones), computer devices (e.g., personal digital assistants (PDAs), tablet personal computers (PCs), laptop PCs, desktop PCs, workstations, or servers), portable multimedia devices (e.g., electronic book readers or Motion Picture Experts Group (MPEG-1 or MPEG-2) Audio Layer 3 (MP3) players), portable medical devices (e.g., heartbeat measuring devices, blood glucose monitoring devices, blood pressure measuring devices, and body temperature measuring devices), cameras, or wearable devices. The wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit). According to various embodiments, the electronic device may include at least one of, for example, televisions (TVs), digital versatile disk (DVD) players, audios, audio accessory devices (e.g., speakers, headphones, or headsets), refrigerators, air conditioners, cleaners, ovens, microwave ovens, washing machines, air cleaners, set-top boxes, home automation control panels, security control panels, game consoles, electronic dictionaries, electronic keys, camcorders, or electronic picture frames.

In another embodiment, the electronic device may include at least one of navigation devices, satellite navigation system (e.g., Global Navigation Satellite System (GNSS)), event data recorders (EDRs) (e.g., black box for a car, a ship, or a plane), vehicle infotainment devices (e.g., head-up display for vehicle), industrial or home robots, drones, automated teller machines (ATMs), points of sales (POSs), measuring instruments (e.g., water meters, electricity meters, or gas meters), or Internet of things (e.g., light bulbs, sprinkler devices, fire alarms, thermostats, or street lamps). The electronic device according to an embodiment of the disclosure may not be limited to the above-described devices, and may provide functions of a plurality of devices like smartphones which have measurement function of personal biometric information (e.g., heart rate or blood glucose). In the disclosure, the term "user" may refer to a person who uses an electronic device or may refer to a device (e.g., an artificial intelligence electronic device) that uses the electronic device.

FIG. 13 is a block diagram illustrating the electronic device 1301 (e.g., the foldable electronic device 101 of FIG. 1) in the network environment 1300 according to various embodiments. Referring to FIG. 13, the electronic device 1301 in the network environment 1300 may communicate with an electronic device 1302 via a first network 1398 (e.g., a short-range wireless communication network), or an electronic device 1304 or a server 1308 via a second network 1399 (e.g., a long-range wireless communication network). According to an embodiment, the electronic device 1301 may communicate with the electronic device 1304 via the server 1308. According to an embodiment, the electronic device 1301 may include a processor 1320, memory 1330, an input device 1350, a sound output device 1355, a display device 1360, an audio module 1370, a sensor module 1376, an interface 1377, a haptic module 1379, a camera module 1380 (e.g., the camera 180 of FIG. 1), a power management module 1388, a battery 1389, a communication module 1390, a subscriber identification module (SIM) 1396, or an antenna module 1397. In some embodiments, at least one (e.g., the display device 1360 or the camera module 1380) of the components may be omitted from the electronic device 1301, or one or more other components may be added in the electronic device 1301. In some embodiments, some of the components may be implemented as single integrated circuitry. For example, the sensor module 1376 (e.g., a fingerprint sensor, an iris sensor, or an illuminance sensor) may be implemented as embedded in the display device 1360 (e.g., a display).

The processor 1320 may execute, for example, software (e.g., a program 1340) to control at least one other component (e.g., a hardware or software component) of the electronic device 1301 coupled with the processor 1320, and may perform various data processing or computation. According to one embodiment, as at least part of the data processing or computation, the processor 1320 may load a command or data received from another component (e.g., the sensor module 1376 or the communication module 1390) in a volatile memory 1332, process the command or the data stored in the volatile memory 1332, and store resulting data in a non-volatile memory 1334. According to an embodiment, the processor 1320 may include a main processor 1321 (e.g., a central processing unit (CPU) or an application processor (AP)), and an auxiliary processor 1323 (e.g., a graphics processing unit (GPU), an image signal processor (ISP), a sensor hub processor, or a communication processor (CP)) that is operable independently from, or in conjunction with, the main processor 1321. Additionally or alternatively, the auxiliary processor 1323 may be adapted to consume less power than the main processor 1321, or to be specific to a specified function. The auxiliary processor 1323 may be implemented as separate from, or as part of the main processor 1321.

The auxiliary processor 1323 may control at least some of functions or states related to at least one component (e.g., the display device 1360, the sensor module 1376, or the communication module 1390) among the components of the electronic device 1301, instead of the main processor 1321 while the main processor 1321 is in an inactive (e.g., sleep) state, or together with the main processor 1321 while the main processor 1321 is in an active state (e.g., executing an application). According to an embodiment, the auxiliary processor 1323 (e.g., an ISP or a CP) may be implemented as part of another component (e.g., the camera module 1380 or the communication module 1390) functionally related to the auxiliary processor 1323.

The memory 1330 may store various data used by at least one component (e.g., the processor 1320 or the sensor module 1376) of the electronic device 1301. The various data may include, for example, software (e.g., the program 1340) and input data or output data for a command related thereto. The memory 1330 may include the volatile memory 1332 or the non-volatile memory 1334.

The program 1340 may be stored in the memory 1330 as software, and may include, for example, an operating system (OS) 1342, middleware 1344, or an application 1346.

The input device 1350 may receive a command or data to be used by other component (e.g., the processor 1320) of the electronic device 1301, from the outside (e.g., a user) of the electronic device 1301. The input device 1350 may include, for example, a microphone, a mouse, a keyboard, or a digital pen (e.g., a stylus pen).

The sound output device 1355 may output sound signals to the outside of the electronic device 1301. The sound output device 1355 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1360 may visually provide information to the outside (e.g., a user) of the electronic device 1301. The display device 1360 may include, for example, a display, a hologram device, or a projector and control circuitry to control a corresponding one of the display, hologram device, and projector. According to an embodiment, the display device 1360 may include touch circuitry adapted to detect a touch, or sensor circuitry (e.g., a pressure sensor) adapted to measure the intensity of force incurred by the touch.

The audio module 1370 may convert a sound into an electrical signal and vice versa. According to an embodiment, the audio module 1370 may obtain the sound via the input device 1350, or output the sound via the sound output device 1355 or an external electronic device (e.g., an electronic device 1302) (e.g., speaker of headphone) directly (e.g., wiredly) or wirelessly coupled with the electronic device 1301.

The sensor module 1376 may detect an operational state (e.g., power or temperature) of the electronic device 1301 or an environmental state (e.g., a state of a user) external to the electronic device 1301, and then generate an electrical signal or data value corresponding to the detected state. According to an embodiment, the sensor module 1376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1377 may support one or more specified protocols to be used for the electronic device 1301 to be coupled with the external electronic device (e.g., the electronic device 1302) directly (e.g., wiredly) or wirelessly. According to an embodiment, the interface 1377 may include, for example, a high definition multimedia interface (HDMI), a universal serial bus (USB) interface, a secure digital (SD) card interface, or an audio interface.

A connecting terminal 1378 may include a connector via which the electronic device 1301 may be physically connected with the external electronic device (e.g., the electronic device 1302). According to an embodiment, the connecting terminal 1378 may include, for example, a HDMI connector, a USB connector, a SD card connector, or an audio connector (e.g., a headphone connector).

The haptic module 1379 may convert an electrical signal into a mechanical stimulus (e.g., a vibration or a movement) or electrical stimulus which may be recognized by a user via his tactile sensation or kinesthetic sensation. According to an embodiment, the haptic module 1379 may include, for example, a motor, a piezoelectric element, or an electric stimulator.

The camera module 1380 may capture a still image or moving images. According to an embodiment, the camera module 1380 may include one or more lenses, image sensors, ISPs, or flashes.

The power management module 1388 may manage power supplied to the electronic device 1301. According to one embodiment, the power management module 1388 may be implemented as at least part of, for example, a power management integrated circuit (PMIC).

The battery 1389 may supply power to at least one component of the electronic device 1301. According to an embodiment, the battery 1389 may include, for example, a primary cell which is not rechargeable, a secondary cell which is rechargeable, or a fuel cell.

The communication module 1390 may support establishing a direct (e.g., wired) communication channel or a wireless communication channel between the electronic device 1301 and the external electronic device (e.g., the electronic device 1302, the electronic device 1304, or the server 1308) and performing communication via the established communication channel. The communication module 1390 may include one or more communication processors that are operable independently from the processor 1320 (e.g., the AP) and supports a direct (e.g., wired) communication or a wireless communication. According to an embodiment, the communication module 1390 may include a wireless communication module 1392 (e.g., a cellular communication module, a short-range wireless communication module, or a global navigation satellite system (GNSS) communication module) or a wired communication module 1394 (e.g., a local area network (LAN) communication module or a power line communication (PLC) module). A corresponding one of these communication modules may communicate with the external electronic device 1304 via the first network 1398 (e.g., a short-range communication network, such as Bluetooth, wireless-fidelity (Wi-Fi) direct, or infrared data association (IrDA)) or the second network 1399 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1392 may identify and authenticate the electronic device 1301 in a communication network, such as the first network 1398 or the second network 1399, using subscriber information (e.g., international mobile subscriber identity (IMSI)) stored in the subscriber identification module 1396.

The antenna module 1397 may transmit or receive a signal or power to or from the outside (e.g., the external electronic device) of the electronic device 1301. According to an embodiment, the antenna module 1397 may include an antenna including a radiating element composed of a conductive material or a conductive pattern formed in or on a substrate (e.g., PCB). According to an embodiment, the antenna module 1397 may include a plurality of antennas. In such a case, at least one antenna appropriate for a communication scheme used in the communication network, such as the first network 1398 or the second network 1399, may be selected, for example, by the communication module 1390 from the plurality of antennas. The signal or the power may then be transmitted or received between the communication module 1390 and the external electronic device via the selected at least one antenna. According to an embodiment, another component (e.g., a radio frequency integrated circuit (RFIC)) other than the radiating element may be additionally formed as part of the antenna module 1397.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1301 and the external electronic device 1304 via the server 1308 coupled with the second network 1399. Each of the external electronic devices 1302 and 1304 may be a device of a same type as, or a different type, from the electronic device 1301. According to an embodiment, all or some of operations to be executed at the electronic device 1301 may be executed at one or more of the external electronic devices 1302, 1304, or 1308. For example, when the electronic device 1301 should perform a function or a service automatically, or in response to a request from a user or another device, the electronic device 1301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1301. The electronic device 1301 may provide the outcome, with or without further processing of the outcome, as at least part of a reply to the request. To that end, a cloud computing, distributed computing, or client-server computing technology may be used, for example.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1340) including one or more instructions that are stored in a storage medium (e.g., internal memory 1336 or external memory 1338) that is readable by a machine (e.g., the electronic device 1301). For example, a processor (e.g., the processor 1320) of the machine (e.g., the electronic device 1301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, a foldable electronic device (e.g., the foldable electronic device 101 of FIG. 1) may include a flexible display (e.g., the flexible display 110 of FIG. 1), a sensor panel (e.g., the sensor panel 111 of FIG. 2) disposed at a lower layer of the flexible display 110 (e.g., the flexible display 110 of FIG. 1), a sensor circuitry (e.g., the sensor circuitry 130 of FIG. 4A) to control the sensor panel (e.g., the sensor panel 111 of FIG. 2), a first housing (e.g., the first housing 121 of FIG. 1) equipped with a first display part (e.g., the first display part 110*a* of FIG. 1) of the flexible display (e.g., the flexible display 110 of FIG. 1) and a first panel part of the sensor panel (e.g., the sensor panel 111 of FIG. 2), a second housing (e.g., the second housing 122 of FIG. 1) equipped with a second display part (e.g., the second display part 110*b* of FIG. 1) of the flexible display (e.g., the flexible display 110 of FIG. 1) and a second panel part of the sensor panel (e.g., the sensor panel 111 of FIG. 2), and a folding structure to rotate the first housing (e.g., the first housing 121 of FIG. 1) or the second housing (e.g., the second housing 122 of FIG. 1). The sensor panel (e.g., the sensor panel 111 of FIG. 2) may include a plurality of loop coils (e.g., the plurality of loop coils 210 and 220 of FIG. 2). The sensor circuitry (e.g., the sensor circuitry 130 of FIG. 4A) may transmit or receive a first resonance signal to recognize an operation of an electronic pen through the plurality of loop coils (e.g., the plurality of loop coils 210 and 220 of FIG. 2), output a second resonance signal through a first loop coil (e.g., the transmit coil 211 of FIG. 2) included in one panel part of the first panel part or the second panel part, receives the second resonance signal through a second loop coil (e.g., the receive coil 212 of FIG. 2) included in a remaining one panel part of the first panel part or the second panel part, and determine an angle between the first housing (e.g., the first housing 121 of FIG. 1) and the second housing (e.g., the second housing 122 of FIG. 1), based on the received second resonance signal.

According to various embodiments, the sensor panel (e.g., the sensor panel 111 of FIG. 2) may be a digitizer panel to recognize the operation of the electronic pen internetworking with the foldable electronic device (e.g., the foldable electronic device 101 of FIG. 1).

According to various embodiments, the sensor circuitry (e.g., the sensor circuitry 130 of FIG. 4A) may output the first resonance signal having a first frequency, and output the second resonance signal having a second frequency different from the first frequency.

According to various embodiments, the sensor circuitry (e.g., the sensor circuitry 130 of FIG. 4A) may output the first resonance signal having a first intensity, and output the second resonance signal having a second intensity different from the first intensity.

According to various embodiments, the first loop coil (e.g., the transmit coil 211 of FIG. 2) and the second loop coil (e.g., the receive coil 212 of FIG. 2) overlap each other or are disposed at a specified distance, when the first housing (e.g., the first housing 121 of FIG. 1) and the second housing (e.g., the second housing 122 of FIG. 1) are folded.

According to various embodiments, the sensor circuitry (e.g., the sensor circuitry 130 of FIG. 4A) operates the sensor panel (e.g., the sensor panel 111 of FIG. 2) in a specified cycle, transmits or receives the first resonance signal through the first loop coil (e.g., the transmit coil 211 of FIG. 2) and the second loop coil (e.g., the receive coil 212 of FIG. 2) for a first time duration of the specified cycle, and outputs the second resonance signal through the first loop coil (e.g., the transmit coil 211 of FIG. 2) and receives the second resonance signal through the second loop coil (e.g., the receive coil 212 of FIG. 2), for a second time duration of the specified cycle.

According to various embodiments, the sensor circuitry (e.g., the sensor circuitry 130 of FIG. 4A) dynamically changes the first time duration or the second time duration depending on an operating state of the electronic pen (e.g., the electronic pen 202 of FIG. 2).

According to various embodiments, the first loop coil (e.g., the transmit coil 211 of FIG. 2) and the second loop coil (e.g., the receive coil 212 of FIG. 2) may be disposed in parallel to an axis about which the first housing (e.g., the first housing 121 of FIG. 1) or the second housing (e.g., the second housing 122 of FIG. 1) rotate.

According to various embodiments, a plurality of first loop coils (e.g., transmit coils 211 of FIG. 2) and a plurality of second loop coils (e.g., the receive coils 212 of FIG. 2) may be provided. The first loop coil (e.g., the transmit coil 211 of FIG. 2) may be an entire portion of coils included in the one panel part, and the second loop coil (e.g., the receive coil 212 of FIG. 2) may be an entire portion of coils included in the remaining one panel part. The sensor circuitry (e.g., the sensor circuitry 130 of FIG. 4A) may determine an angle between the first housing (e.g., the first housing 121 of FIG. 1) and the second housing (e.g., the second housing 122 of FIG. 1), based on a pattern of the received second resonance signal.

According to various embodiments, the sensor circuitry (e.g., the sensor circuitry 130 of FIG. 4A) may output a third resonance signal through a third loop coil included in the one panel part, may receive the third resonance signal through a fourth loop coil included in the remaining one panel part, and may determine the angle between the first housing (e.g., the first housing 121 of FIG. 1) and the second housing (e.g., the second housing 122 of FIG. 1) based on the received second resonance signal or the received third resonance signal. The first loop coil (e.g., the transmit coil 211 of FIG. 2) and the second loop coil (e.g., the receive coil 212 of FIG. 2) may be disposed at a first distance from the folding structure. The third loop coil and the fourth loop coil may be disposed at a second distance which is shorter than the first distance from the folding structure.

According to various embodiments, the sensor circuitry (e.g., the sensor circuitry 130 of FIG. 4A) may transmit or receive the second resonance signal through the first loop coil (e.g., the transmit coil 211 of FIG. 2) and the second loop coil (e.g., the receive coil 212 of FIG. 2), when the angle is reduced, and may transmit or receive the third resonance signal through the third loop coil and the fourth loop coil, when the angle is increased. The sensor circuitry (e.g., the sensor circuitry 130 of FIG. 4A) may set an intensity of the second resonance signal to be less than an intensity of the third resonance signal. The sensor circuitry (e.g., the sensor circuitry 130 of FIG. 4A) may set an intensity of the first resonance signal to be less than an intensity of the second resonance signal.

According to various embodiments, the sensor circuitry (e.g., the sensor circuitry 130 of FIG. 4A) may output the second resonance signal having a first intensity through the first loop coil (e.g., the transmit coil 211 of FIG. 2), when the angle is reduced, and may output the second resonance signal having a second intensity less than the first intensity through the first loop coil (e.g., the transmit coil 211 of FIG. 2), when the angle is increased.

According to various embodiments, the first resonance signal may include identification information of the electronic pen, and the second resonance signal may include identification information of the foldable electronic device (e.g., the foldable electronic device 101 of FIG. 1).

According to various embodiments, a foldable electronic device (e.g., the foldable electronic device 1201 of FIG. 12) may include a flexible display (e.g., the flexible display 1210 of FIG. 12), a first housing (e.g., the first housing 1221 of FIG. 12) equipped with a first display part (e.g., the first display part 1210a of FIG. 12) of the flexible display (e.g., the flexible display 110 of FIG. 12), a second housing (e.g., the second housing 1222 of FIG. 12) equipped with a second display part (e.g., the second display part 1210b of FIG. 12) of the flexible display, a folding structure (e.g., the folding structure 1225 of FIG. 12) to rotate the first housing (e.g., the first housing 1221 of FIG. 12) or the second housing (e.g., the second housing 1222 of FIG. 12), a first coil disposed inside the first housing (e.g., the first housing 1221 of FIG. 12), a second coil disposed inside the second housing (e.g., the second housing 1222 of FIG. 12), and a processor. The processor may output a resonance signal through the first coil, receive the resonance signal through the second coil, and determine an angle between the first housing and the second housing, based on the received resonance signal.

According to various embodiments, the foldable electronic device (e.g., the foldable electronic device 1201 of FIG. 12) may further include a battery, and the first coil and the second coil may be coils to wireless charge the battery.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A foldable electronic device comprising:
   a flexible display;
   a sensor panel disposed adjacent to an inner surface of the flexible display;
   a sensor circuitry;
   a first housing equipped with a first display part of the flexible display and a first panel part of the sensor panel;
   a second housing equipped with a second display part of the flexible display and a second panel part of the sensor panel; and
   a folding structure configured to rotate the first housing or the second housing,
   wherein the sensor panel includes a plurality of loop coils, and
   wherein the sensor circuitry is configured to:
      transmit or receive a first resonance signal to recognize an operation of an electronic pen through the plurality of loop coils;
      output a second resonance signal through a first loop coil included in one panel part of the first panel part or the second panel part;
      receive the second resonance signal through a second loop coil included in a remaining one panel part of the first panel part or the second panel part; and
      determine an angle between the first housing and the second housing, based on the received second resonance signal,
   wherein the first resonance signal and the second resonance signal are different in at least one of a frequency or an intensity.

2. The foldable electronic device of claim 1, wherein the sensor panel is a digitizer panel to recognize the operation of the electronic pen internetworking with the foldable electronic device.

3. The foldable electronic device of claim 1, wherein the sensor circuitry is further configured to:
   output the first resonance signal having a first frequency, and
   output the second resonance signal having a second frequency different from the first frequency.

4. The foldable electronic device of claim 1, wherein the sensor circuitry is further configured to:
   output the first resonance signal having a first intensity, and
   output the second resonance signal having a second intensity different from the first intensity.

5. The foldable electronic device of claim 1, wherein the first loop coil and the second loop coil overlap each other or are disposed at a specified distance, when the first housing and the second housing are folded.

6. The foldable electronic device of claim 1, wherein the sensor circuitry is further configured to:
   operate the sensor panel in a specified cycle;
   transmit or receive the first resonance signal through the first loop coil and the second loop coil for a first time duration of the specified cycle; and
   output the second resonance signal through the first loop coil and receive the second resonance signal through the second loop coil, for a second time duration of the specified cycle.

7. The foldable electronic device of claim 6, wherein the sensor circuitry dynamically changes the first time duration or the second time duration depending on an operating state of the electronic pen.

8. The foldable electronic device of claim 1, wherein the first loop coil and the second loop coil are disposed in parallel to an axis about which the first housing or the second housing rotates.

9. The foldable electronic device of claim 1, wherein the first loop coil is composed of a plurality of coils included in the one panel part.

10. The foldable electronic device of claim 1, wherein the second loop coil is composed of a plurality of coils included in the remaining one panel part.

11. The foldable electronic device of claim 1, wherein the sensor circuitry is further configured to determine an angle between the first housing and the second housing, based on a pattern of the received second resonance signal.

12. The foldable electronic device of claim 1, wherein the sensor circuitry is further configured to:
   output a third resonance signal through a third loop coil included in the one panel part,
   receive the third resonance signal through a fourth loop coil included in the remaining one panel part, and
   determine the angle between the first housing and the second housing based on the received second resonance signal or the received third resonance signal.

13. The foldable electronic device of claim 12, wherein the first loop coil and the second loop coil are disposed at a first distance from the folding structure, and
   wherein the third loop coil and the fourth loop coil are disposed at a second distance which is less than the first distance from the folding structure.

14. The foldable electronic device of claim 13, wherein the sensor circuitry is further configured to:
   transmit or receive the second resonance signal through the first loop coil and the second loop coil, when the angle is decreased; and
   transmit or receive the third resonance signal through the third loop coil and the fourth loop coil, when the angle is increased.

15. The foldable electronic device of claim 14, wherein the sensor circuitry is further configured to set an intensity of the second resonance signal to be less than an intensity of the third resonance signal.

16. The foldable electronic device of claim 1, wherein the sensor circuitry is further configured to set an intensity of the first resonance signal to be less than an intensity of the second resonance signal.

17. The foldable electronic device of claim 1, wherein the sensor circuitry is further configured to:
output the second resonance signal having a first intensity through the first loop coil, when the angle is decreased; and
output the second resonance signal having a second intensity less than the first intensity through the first loop coil, when the angle is increased.

18. The foldable electronic device of claim 1, wherein the first resonance signal includes identification information of the electronic pen, and
wherein the second resonance signal includes identification information of the foldable electronic device.

19. A foldable electronic device comprising:
a flexible display;
a first housing equipped with a first display part of the flexible display;
a second housing equipped with a second display part of the flexible display;
a folding structure configured to rotate the first housing or the second housing;
a first coil disposed inside the first housing;
a second coil disposed inside the second housing; and
a processor configured to:
output a resonance signal through the first coil;
receive the resonance signal through the second coil; and
determine an angle between the first housing and the second housing, based on the received resonance signal.

20. The foldable electronic device of claim 19, further comprising:
a battery,
wherein the first coil and the second coil wirelessly charge the battery.

* * * * *